June 19, 1962 W. J. MOE ET AL 3,039,688
DIGITAL INCREMENTAL COMPUTER
Filed May 16, 1956 9 Sheets-Sheet 1

$(AB+D)(\bar{E}+\bar{F}) = C$

INVENTORS
WALTER J. MOE
BYRON D. SMITH
CLAIR E. MILLER
SEYMOUR R. CRAY
BY Cushman, Darby & Cushman
ATTORNEYS

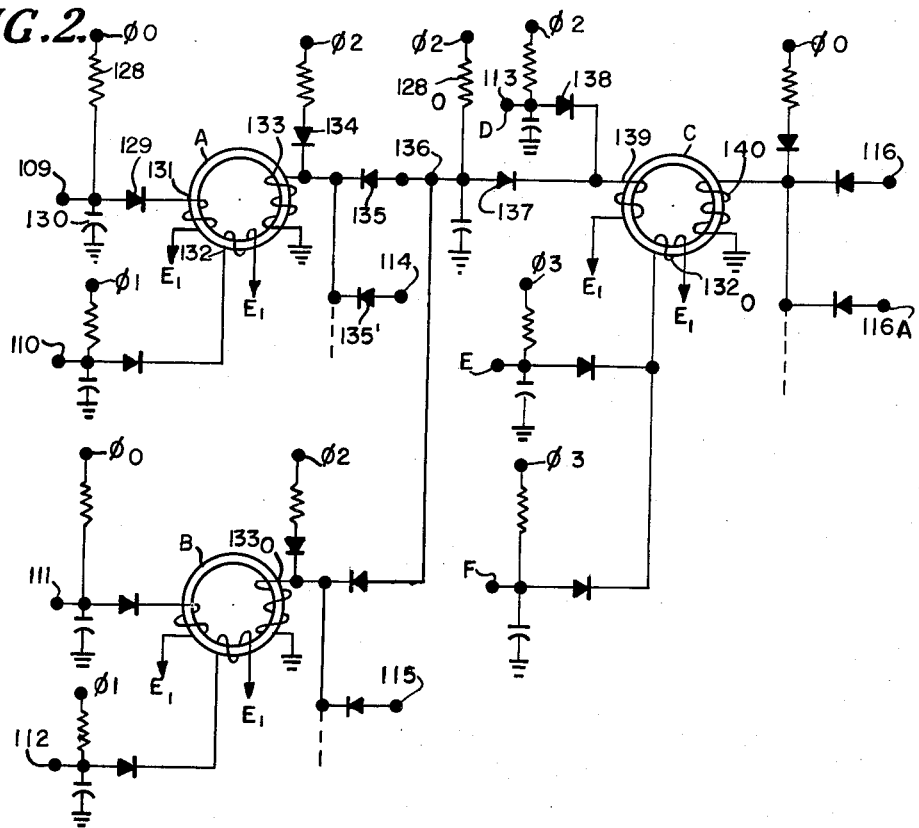
FIG. 2.
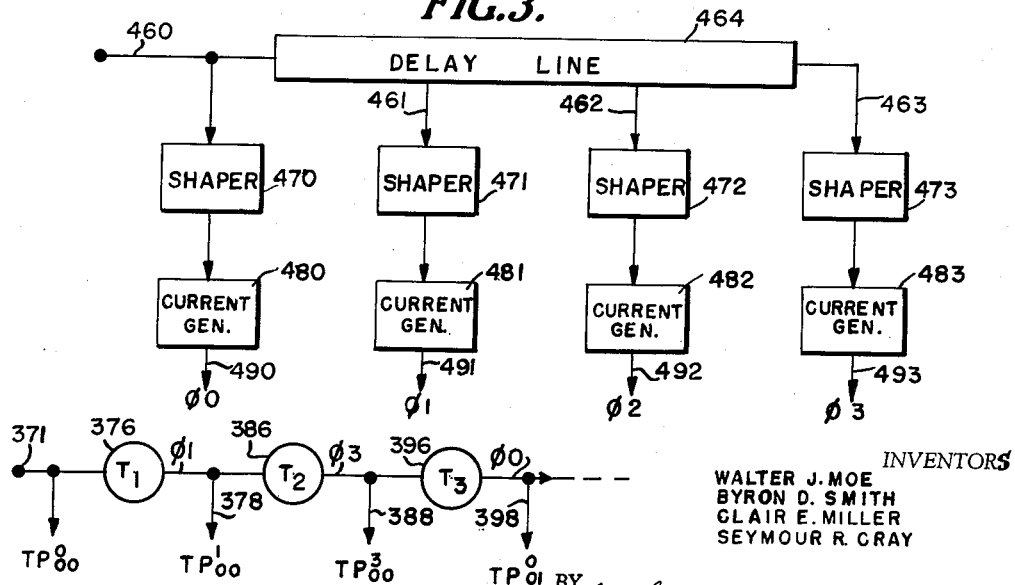
FIG. 3.
FIG. 4.
INVENTORS
WALTER J. MOE
BYRON D. SMITH
CLAIR E. MILLER
SEYMOUR R. CRAY
BY Cushman, Darby & Cushman
ATTORNEYS

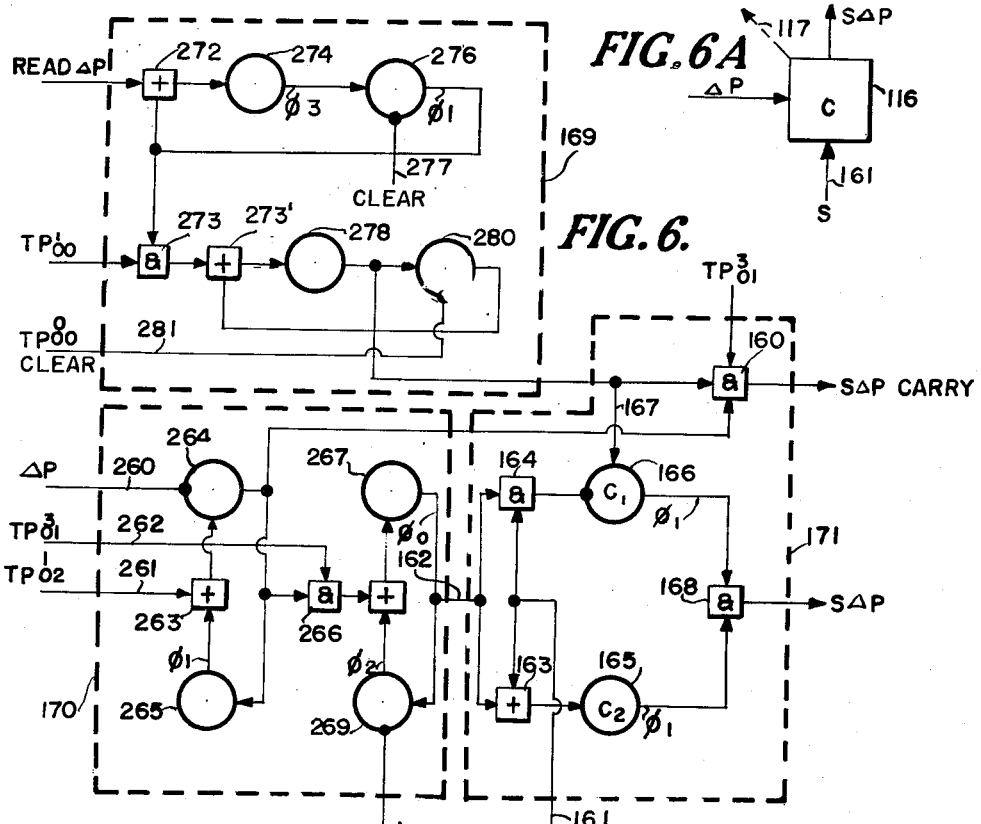

June 19, 1962 W. J. MOE ET AL 3,039,688
DIGITAL INCREMENTAL COMPUTER
Filed May 16, 1956 9 Sheets-Sheet 6

FIG. 9.
SAMPLE PROGRAM

| DIGIT PERIODS | MACHINE COMMANDS ||||
|---|---|---|---|---|
| | MINOR CYCLE X-2 | MINOR CYCLE X-1 | MINOR CYCLE X | MINOR CYCLE X+1 |
| 00 | INIT. MINOR CYCLE | INIT. MINOR CYCLE | INIT. MINOR CYCLE | INIT. MINOR CYCLE |
| 01 | - - - | END PULSE | - - | END PULSE |
| 02 | - - - | - - | - - | - - |
| 03 | - - | - - | - - | - - |
| 04 | - - | DIGIT ADDRESS $Y_1$ | - - | - - |
| 05 | - - | - - | - - | DIGIT ADDRESS $Y_4$ |
| 06 | - - | READ TO $\Delta V$ | - - | - - |
| 07 | - - | READ TO $\Delta Q$ | - - | - - |
| 08 | - - | - - | - - | - - |
| 09 | INIT. COMPARISON | - - | INIT. COMPARISON | - - |
| 10 | MOD. ADDRESS $M_1$ | - - | MOD. ADDRESS $M_2$ | - - |
| 11 | - - | DIGIT ADDRESS $Y_2$ | - - | - - |
| 12 | - - | READ TO $\Delta T$ | - - | - - |
| 13 | - - | READ TO $\Delta u$ | - - | - - |
| 14 | - - | DIGIT ADDRESS $Y_3$ | - - | - - |
| 15 | - - | READ TO $\Delta P$ | - - | - - |
| 16 | - - | - - | - - | - - |
| 17 | - - | DIGIT ADDRESS $Y_4$ | - - | - - |
| 18 | - - | READ TO $\Delta W$ | - - | - - |

FIG. 10.

| $2^6$ | $2^5$ | $2^4$ | $2^3$ | $2^2$ | $2^1$ | $2^0$ | DIGIT POSITION |
|---|---|---|---|---|---|---|---|
| 1 | 0 | 0 | 0 | 0 | 0 | 0 | NO ACTION |
| 0 | $y_5$ | $y_4$ | $y_3$ | $y_2$ | $y_1$ | $y_0$ | STORAGE ADDRESS "Y" OR MODULATOR "M" |
| 1 | 0 | 1 | - - | - - | - - | - - | INITIATE COMPARISON |
| 1 | 1 | 0 | - - | - - | - - | - - | END PULSE |
| 1 | 1 | 1 | - - | - - | - - | - - | INITIATE MINOR CYCLE |
| 1 | - - | - - | 0 | 0 | 0 | 1 | READ TO $\Delta P$ |
| 1 | - - | - - | 0 | 0 | 1 | 0 | READ TO $\Delta W$ |
| 1 | - - | - - | 0 | 0 | 1 | 1 | READ TO $\Delta V$ |
| 1 | - - | - - | 0 | 1 | 0 | 0 | READ TO $\Delta Q$ |
| 1 | - - | - - | 0 | 1 | 0 | 1 | READ TO $\Delta T$ |
| 1 | - - | - - | 0 | 1 | 1 | 0 | READ TO $\Delta u$ |
| 1 | - - | - - | 1 | 1 | 1 | 1 | INITIATE MAJOR CYCLE |

INVENTORS
WALTER J. MOE
BYRON D. SMITH
CLAIR E. MILLER
SEYMOUR R. CRAY
BY *Cushman, Darby & Cushman*
ATTORNEYS

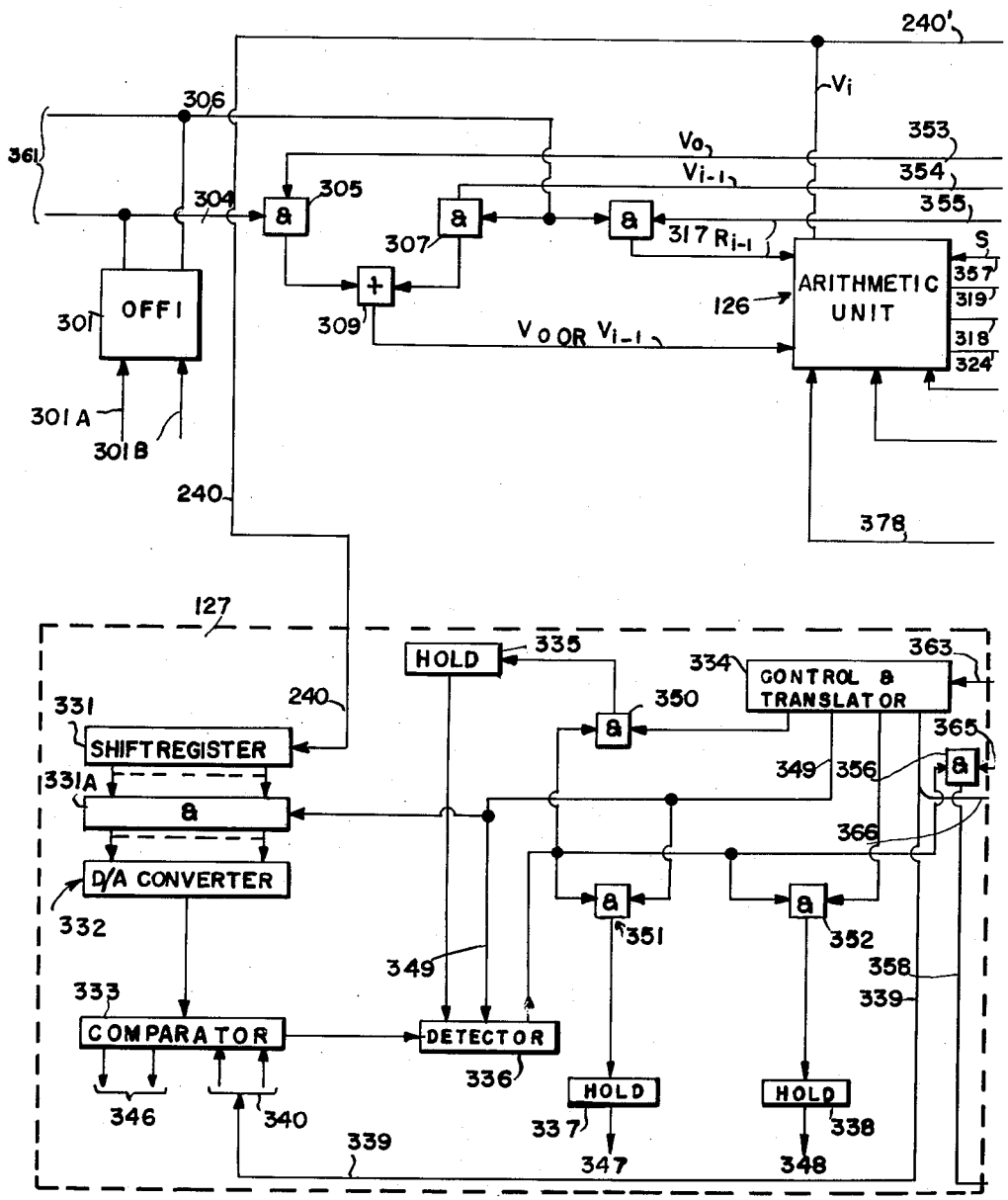

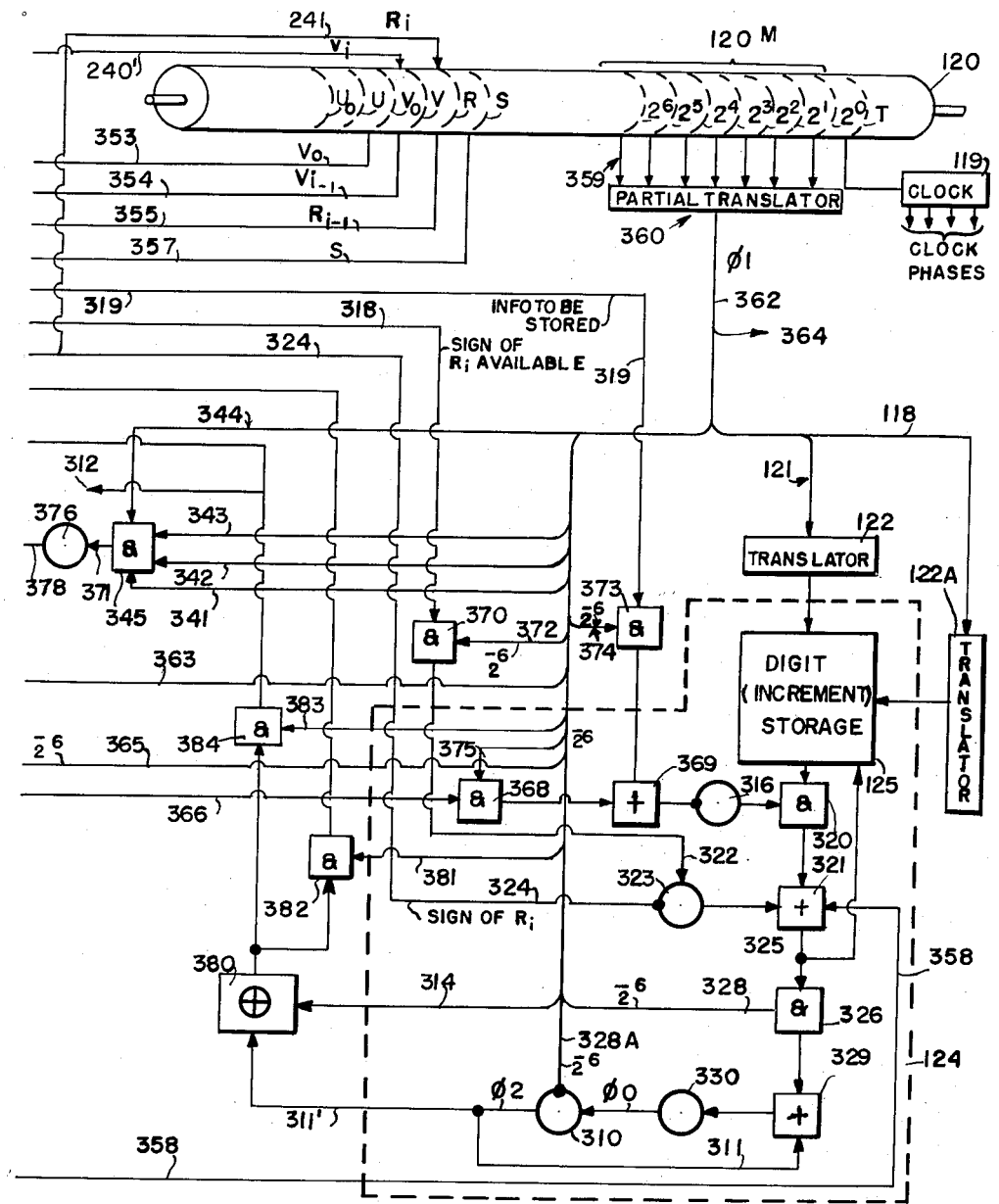
FIG. 11.B

United States Patent Office 3,039,688
Patented June 19, 1962

3,039,688
DIGITAL INCREMENTAL COMPUTER
Walter J. Moe, St. Paul, and Byron D. Smith, Minneapolis, Minn., and Clair E. Miller, San Rafael, Calif., and Seymour R. Cray, Minneapolis, Minn., assignors to Sperry Rand Corporation, New York, N.Y., a corporation of Delaware
Filed May 16, 1956, Ser. No. 585,312
51 Claims. (Cl. 235—152)

This invention relates generally to incremental computers and specifically to a new machine logic best suited for control system applications wherein the inputs are continuously variable.

Several incremental digital computers (commonly termed digital differential analyzers) have been developed. In these computers the various mathematical operations are performed by means of digital integrators. Integration is performed by successive incremental rectangular approximations of the integration process. That is, the previous value of the output is corrected by adding or subtracting an output increment and then is multiplied by an input increment. The summation of these incremental rectangles is the approximation of the desired integral. Inputs and outputs of these integrators are streams of electrical impulses which represent binary encoded values. By properly interconnecting a number of these integrators any continuous function can be solved.

Our invention provides an improved and novel logic for incremental computers which greatly expands the types of basic operation steps of this class of digital computers. This logic is specifically designed for real time process control where the control over the process is a function of independent and dependent variable factors. The computer employs operations such as scaled incremental multiplication and division as basic mathematical steps. These operations are performed by properly sequencing and modifying streams of electrical impulses which may represent binary encoded values or abstract notations. It will be obvious that this logic may be employed in environments not involved with processes and real time calculations.

Accordingly it is an object of our invention to provide in a digital incremental computer novel apparatus employing new and improved machine logic.

Another object of our invention is to provide in a digital incremental computer apparatus for solving several problems simultaneously or sequentially.

Still another object of our invention is to provide a digital incremental computer wherein the multiplication time is reduced from one-fourth to one-half of the time required by previous incremental computers.

Still another object is to provide a digital incremental computer which is peculiarly adapted to real time control functions.

A further object is to provide a digital incremental computer which is drift free, that is, the computer error is bounded.

A still further object is to provide in a digital incremental computer apparatus for scaling a product simultaneously with computing an increment.

Another object is to provide in a digital incremental computer apparatus for retaining a remainder for eventual processing while the input is varying in a manner as to cause the output to lag.

Another object is to provide a digital incremental computer in which the incremental multiplication is performed serially in one word length.

Other objects and advantages will become obvious from the appended claims and the following description of the various features and phases of the exemplary embodiments according to the invention, wherein:

FIGURE 2 illustrates a logical switching network as used in our first embodiment;

FIGURE 3 is a block diagram of a four-phase clock pulse generator;

FIGURE 4 is a shorthand schematic of a portion of a magnetic core shift register used to generate a long sequence of electrical timing impulses;

FIGURE 6 is a shorthand schematic of a complementer using 2's complement notation;

FIGURE 6A is a block symbol of the schematic of FIGURE 6;

FIGURE 7 is a shorthand schematic of a serial adder using a 2's complement notation;

FIGURE 7A is a block symbol of the schematic of FIGURE 7;

FIGURE 9 is a table illustrating a multiply algorithm program based on our basic algorithm;

FIGURE 10 illustrates a sample computer instruction code structure used to describe the program of FIGURE 9;

FIGURE 11A is part of a mixed block and shorthand schematic diagram illustrating the implementation of a few machine commands;

FIGURE 11B is the remainder of the diagram of FIGURE 11A, these making up FIGURE 11 as referred to hereinafter.

Figure 1:
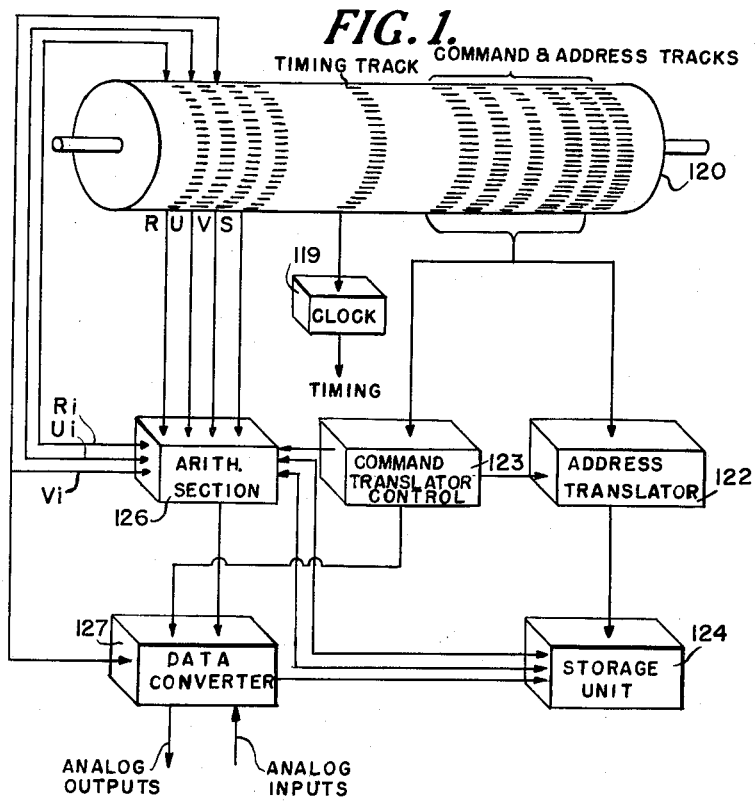
FIGURE 1 is a functional diagram of our incremental computer.

The environment background chosen for the explanation of our invention in a first embodiment, illustrated generally in FIGURE 1, is in an airborne control system application. However, limitation thereto is not intended and, it will be obvious that this embodiment can be employed in other environmental situations.

The general theory of operation of our incremental computer in a real time control problem is as follows. Analog inputs (which may be from transducers or the like), are compared with digital values from the arithmetic section 126 in data converter 127. As a result of this comparison, input increments are generated with proper sign to adjust the digital values in accordance with the input analog values. These increments are stored as electrical impulses, in the magnetic core memory 124. These increments are used as determined by the electronically coded program of computer commands stored on magnetic storage drum 120. Likewise, incremental outputs are processed from arithmetic section 126 through data converter 127 to control analog devices (not shown) involved in the process or sequence being controlled. As in any internally programmed computer, means must be provided for entering the program data onto drum 120. Since this does not affect the real time operation of our computer and is well known to those skilled in the art, discussion thereof is thought unnecessary.

The recirculating type of operation in an incremental computer lends itself to the use of a rotating magnetic drum memory 120 as shown in FIGURE 1. In one embodiment the storage capacity of each track is about 1000 binary digits represented by their electrical impulse equivalents. The time intervals between impulses are called "digit periods." A track is a circumferential strip on the drum, wide enough to allow a series of electrical impulses to be recorded as tiny magnetized points along the strip each separated by a time space of five microseconds. All incremental values for an operation are obtained during a preceding operation which eliminates access time requirements. Electrical circuit timing impulses are acquired from one track called the "timing track," on the drum which synchronize all circuitry in the computer with the drum through clock 119. The electrically encoded computer program of commands is taken serially by commands from the drum and gives initiates and monitors all sub-operations required to perform a program, such as, division, transfers, etc., by properly routing the electrical pulses from clock 119. The sequence of execution of program commands in a given program is fixed by their geographical locations on the magnetic storage drum. To save computing time, a high speed magnetic storage unit 124 is used to store increments. The direction of each increment is represented by the presence of an electrical impulse or absence of an electrical impulse (i.e., whether plus one or minus one). The addresses of these increments are interpreted by the electronic address translator 122. The address of each increment is stored on the drum as electrical impulses on the same set of tracks as the program commands. Electrical coding distinguishes the commands from the addresses. Elements 126 contains circuitry which performs the mathematics by routing and comparing various electrical impulses. The four electrically encoded values R, U, V, and S are processed simultaneously in the manner illustrated in FIGURE 8.

The basic operation cycle of our machine is called a digit period which is the time between two successive electrical impulses on the timing track which correspond to one digit position of a serial computer operand word. A series of four electrical impulses furnish electrical circuit timing during each digit period. These impulses occur during clock phases, $\phi 0$, $\phi 1$, $\phi 2$, and $\phi 3$, respectively. The frequency of occurrence of digit periods determines the rate of information transfer in the computer.

The execution of a minor or partial program of commands which usually corresponds to the length of the operand word under consideration is called a minor cycle. Various minor cycles in one complete program may vary in length as the significance of the operands or type of commands executed. The execution of one complete program of commands is called a major computation cycle and in our first embodiment takes one drum revolution or about five milliseconds. The number of minor cycles in a major cycle may vary with computational requirements. In one major cycle each variable operand may be changed by a small increment while the error function, i.e., remainder, may be changed up to the maximum value of an operand. Also one increment may be utilized by numerous minor cycles.

The interpretation or decoding of program commands are, as well as the execution of arithmetic operations, accomplished by a series of electrical circuits performing the logical functions "AND," "OR," and "NOT." These functions can be accomplished by various types of electronic or mechanical circuits but are preferably magnetic logical switching networks.

Figure 2A:
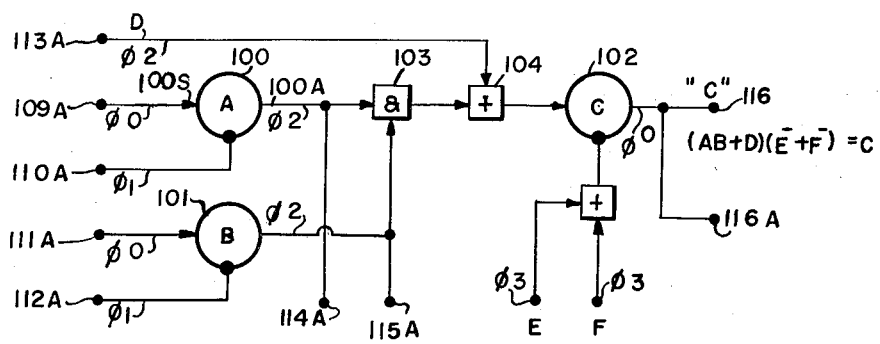
FIGURE 2A illustrates the electrical circuit shorthand symbols used in subsequent figures to describe the switching network of FIGURE 2.

Referring now to FIGURE 2, three magnetic switching cores are denominated respectively by letters A, B, and C. Numerals 100, 101, and 102 in FIGURE 2A designate the shorthand symbols of elements A, B, and C of FIGURE 2, respectively. In FIGURE 2 windings 131 and 132 provide electrical inputs to core A. If a high impedance (not shown) to ground is presented at terminal 109 when an electrical current impulse of $\phi 0$ is applied through resistor 128 so that current will not flow to terminal 109, current flows through diode 129 and winding 131 to potential $E_1$ thereby "setting" core A. By definition, the current "sets" or forces the magnetic remanence of core A to its positive polarized state. If a low impedance (not shown) to ground is presented at terminal 109, all the current is diverted from winding 131 through the low impedance and core A remains unchanged. Capacitor 130 provides a slight current impulse delay which makes the circuit more tolerant. This setting type of input is represented in shorthand symbols by the arrow 100S touching core 100 and attached to terminal 109A which corresponds to terminal 109 of FIGURE 2. The symbol $\phi 0$ beside the arrow indicates a setting input if any occurs during clock phase zero.

Input winding 132 operates in a similar manner while the resultant effect on core A is to "clear" the core, that is, to force the magnetic remanence to the negative polarized state. In the switching networks the inputs to windings 131 and 132 are time separated. The desired impedance at terminal 110 must be presented during $\phi 1$. The shorthand notation of this clearing circuit is shown by the small circle 100C on core 100 which is connected by a line to terminal 110A corresponding to terminal 110 of FIGURE 2. $\phi 1$ beside the connecting line indicates the phase during which a clearing input may appear.

Winding 133 is the sense or output winding of core A. During $\phi 2$ a current impulse is provided to readout or sense the state of this core. Current flowing through isolating diode 134 into winding 133 tends to clear core A. Assuming core A has been set through winding 131 but not cleared, the switching of core A by the current in winding 133 causes a large counter E.M.F. to be induced in winding 133. This makes winding 133 appear as a high impedance to ground. This high impedance can be reflected to other circuits through unidirectional current devices such as diodes 135 and 135'. If core A is in the cleared state, the current through winding 133 has little effect on the magnetic state of core A and thus winding 133 appears as a very low impedance to ground. This low impedance can be imposed on other circuits through diodes 135 and 135'. For example, a similar output winding could provide the impedance levels to input circuits like either of those at terminals 109 and 110 for windings 131 and 132. Each circuit connected to output winding 133 must be isolated by a separate unidirectional current device. Thus the need for both diodes 135 and 135' assuming a second output circuit is utilized at terminal 114. In the shorthand schematic any line, such as line 100A, without an arrowhead or circle touching a symbol for a magnetic element designates an output circuit, and the phase of the output thereon is designated, for example, for line 100A, $\phi 2$.

A $\phi 2$ current is also applied to connecting input circuits and other output windings associated with the logical function to be performed. The current impulse of $\phi 2$ flowing through resistor 1280 to junction 136 is diverted away from winding 139 if either core A or B is in the cleared or low impedance reflection state. Voltage $E_1$ on winding 139 compensates for the small voltage drops across the output windings of cores in the cleared state thereby preventing current from flowing in winding 139. If both core A and core B are set, then junction 136 sees a high impedance to ground from both output windings 133 and 1330 and the current impulse through resistor 1280 flows through unidirectional current device 137 and to winding 139 thereby setting core C. The logical function performed by the described circuit is an "AND" function, which is designated by an "and" sign "&" in box 103 as a shorthand schematic symbol. Extra output circuit connections 114 and 115 of cores A and B are shown by numerals 114A and 115A, respectively, in FIGURE 2A.

Additional circuits may be added to any one input winding for supplying inputs thereto as shown by a second $\phi 2$ input "D" to winding 139 through diode 138 when the impedance at terminal 113 is high. Also, terminals E and F provide two inputs to a second input winding 1320 either of which may clear core C during $\phi 3$. Each different input should be isolated by a separate unidirection current device. The combination of various inputs to one input winding can be described logically as an "OR" function. That is, any current furnished by any one or a multiplicity of input circuits to a single input winding will cause the core to be set or cleared. This logical "OR" function is designated by a plus sign "+" in the box 104 in FIGURE 2A. Input pulses to such an "OR" circuit may be either time-coincident or time-separated. Note that the "AND" function described requires all inputs to be time-coincident.

In FIGURE 2A all functions performed by the schematic are set down in shorthand notation just described, the logical expression for the circuit as shown is at the output terminal of shorthand symbol 102 (core C). When an element is cleared it contains information designated as "$\bar{C}$" which is read "NOT C"; when the element is set it contains data designated as "C." In the formula for the output from core C, the plus signs designate the "OR" functions and multiplication symbols designate "AND" functions so that $(AB+D)(\bar{E}+\bar{F})=C$ is read A and B or D and not E or F equal C.

The switching networks as described above are herein combined into basic arithmetic operating units such as adders, etc. These arithmetic devices are further combined to form the arithmetic section of our computer. Other combinations of these switching networks provide control, data transfer and other functions required of the computer. Since the data transfer rate is equal to the frequency of the digit periods, the time required for any basic unit to process one digit is made equivalent to one digit period. Also since the described circuits are time sensitive, care must be taken to make the various networks mesh together in time. This is accomplished as illustrated in FIGURE 3 for each digit period by providing a cyclic series of four differently phased electrical impulses which provide the circuit timing throughout the computer. Longer timing cycles are provided by shift registers which may be composed of switching networks as illustrated in FIGURE 4. The electrical impulses which are emitted by the shift registers are called "gated" timing pulses in that they are other timing impulses gated by the outputs from clock 119.

To provide the four phase pulse clock sequence for each digit period, the electrical signals obtained from the timing track of magnetic storage drum 120 are serially applied to the clock 119 of FIGURE 1. Referring now to FIGURE 3, the structure and operation of the clock will now be described. The timing track signal is received on line 460 which distributes it to delay line 464 and shaper 470. Shaper 470 can be a standard one-shot multivibrator which generates a single one-microsecond square wave. This square wave is applied to a vacuum tube current generator 480 (an amplifier which produces a current impulse output), which causes a one-microsecond current impulse to be distributed via bus 490 as a $\phi 0$ timing impulse. These $\phi 0$ current impulses may be applied to magnetic elements as shown in FIGURE 2 by the designators "$\phi 0$." The electrical impulse in delay line 464 is delayed 1.25 microseconds from the input successively to tap lines 461, 462 and 463. Thus a $\phi 1$ current which is tapped by line 461 and formed by shaper 471 and current generator 481 begins 1.25 microseconds after $\phi 0$ current, a $\phi 2$ current begins 1.25 microseconds after a $\phi 1$ current etc. $\phi 1$ currents are distributed to magnetic core elements by bus 491. Similarly, $\phi 2$ currents are provided to bus 492 from shaper 472 and current generator 482, after which $\phi 3$ currents are present on bus 493 as provided by shaper 473 and generator 483.

In addition to the electrical impulse distributor of FIGURE 3, a longer and different predetermined sequence of timing pulses is necessary upon the initiation of each minor cycle. This sequence clears the arithmetic section 126 of all data from the preceding minor cycle and inserts new data into the arithmetic devices. The sequence spans the first five digit periods of each minor cycle and in one embodiment thereof consists of fifteen gated impulses. A shorthand schematic of a shifting register circuit for generating the first four of such gated timing pulses is illustrated in FIGURE 4. The impulse applied to the magnetic core shift register at terminal 371 is derived from an electrically encoded command (termed herein "initiate minor cycle") on the storage drum. This derived electrical impulse clears the arithmetic device (not shown in FIGURE 4) of the previous data therein, which data is called "Read $\Delta$P." The notation for this first impulse is $$TP^0_{00}$$

wherein TP designates "timing pulse," the superscript 0 designates the clock phase ($\phi 0$) during which the timing pulse appears and the subscript 00 denotes the digit period of the minor cycle. The digit periods are identified by two decimal digits, the first digit period being 00, the second 01, etc., through 04 for the shift register under consideration. Core 376 is set by pulse $$TP^0_{00}$$

and upon being sensed by a $\phi 1$ pulse from clock 119, develops a second timing pulse $$TP^1_{00}$$

which is distributed by bus 378 to clear out previous data increments, and transfer the new "Read $\Delta$P" into the arithmetic device. Pulse $$TP^1_{00}$$

also sets core 386 which provides an output pulse $$TP^3_{00}$$

for delivery over bus 388 upon receipt of a $\phi 3$ pulse. Similarly, the output of core 396 which is provided during $\phi 0$ of digit period 01 sets the next core (not shown) in the shift register and performs other tasks. The shifting process continues through 11 more cores to provide a timing pulse TP during three predetermined phase periods for the remainder of the first five digit periods. The $\phi 2$ clock pulse of digit period 00 is not used for reasons more evident below. Thus core 386 remains set through two clock phases. Similarly, one core for each of the other four digit periods remains set for two clock phases and only 15 gated timing pulses are produced by the shift register.

Figure 5:
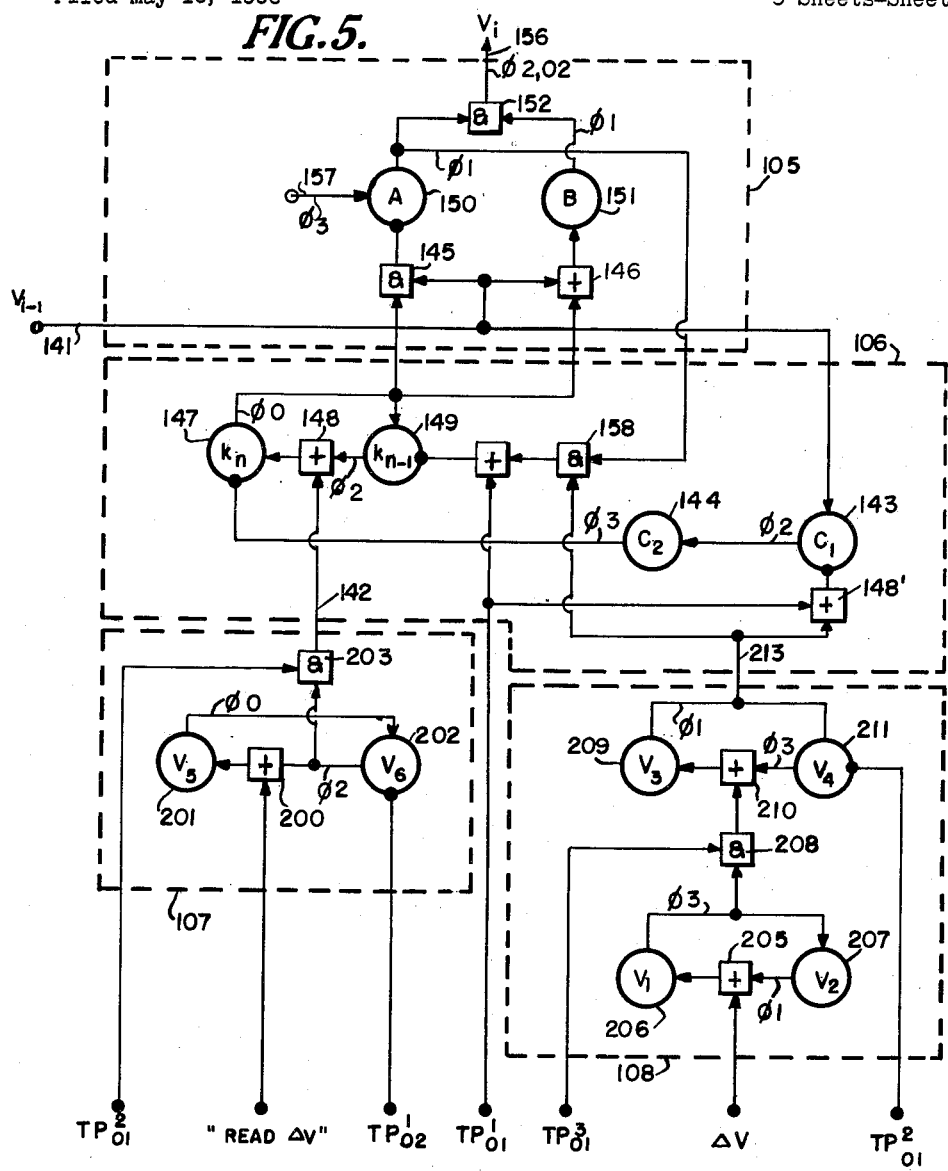
FIGURE 5 is a shorthand schematic of an incremental binary adder using a 2's complement notation.

Since the switching circuits used by us are time sensitive, it is desirable to have a circuit in which electrical impulses may recirculate and thereby temporarily store data until the precise moment it is desired. Such a circuit is shown in FIGURE 5 in dash lined box 107 and is termed a "bit register." A single electrical impulse (e.g., "Read $\Delta$V") is applied to "OR" circuit 200 and thereby sets magnetic core 201. This impulse is recirculated between cores 201 and 202 by alternately sensing and setting the cores based on the four impulse cycle of the computer. When it is desired that the impulse participate in some function, a gated timing pulse of $\phi 2$ (e.g., pulse $$TP^2_{01}$$

from the shift register of FIGURE 4) probes "AND" circuit 203. The impulse from core 202 and the timing pulse form a gated impulse on output line 142 representative of, for example, the programmed incremental input "Read $\Delta$V" to the incremental adder within chain lines 105 and 106. After the impulse is gated out, a subsequent gated timing pulse $$TP^1_{02}$$

clears core 202 thereby erasing the content of the bit register.

In FIGURE 5 there is also illustrated a "$\Delta$V" bit register which is shown in shorthand form within dash lined box 108 including circuitry which accepts a single impulse and as a result thereof generates a stream of impulses. The lower portion of the register 108 including "OR" circuit 205, magnetic cores 206, 207, and "AND" circuit 208 is termed "ΔV" bit register I and it operates in the same manner as register 107 except ΔV is continuously circulated between the cores by sensing and setting during $\phi 1$ and $\phi 3$ while "AND" circuit 208 is probed by a timing pulse $$TP_{01}^{3}$$

The output from "AND" circuit 208 is applied to the upper portion of register 108 which portion includes "OR" circuit 210 and magnetic cores 209, 211 and which is termed "ΔV" bit register II. The impulse from circuit 208 sets core 209 and then recirculates between cores 209 and 211 based on the four impulse cycle of the computer. In each subsequent four phase cycle item 209 is sensed and an electrical impulse is sent to another circuit, such as the illustrated incremental adder. Then a stream of pulses is started shortly after "AND" circuit 208 produces an output and is stopped by applying a gated timing pulse such as $$TP_{01}^{2}$$

to clear core 211 prior to read out.

The presence of an impulse in the "Read ΔV" bit register 107 is interpreted to mean an increment ($\pm 1$) is programmed as ΔV for the instant minor cycle. A machine command executed in the preceding minor cycle caused the ΔV increment to be transferred from storage unit 124 of FIGURE 1 to ΔV register 108 and inserted the "Read ΔV" pulse in register 107. The absence of such a pulse in register 107 is interpreted to mean no increment is programmed. In the case where register 107 contains an impulse, an impulse in register 108 means a plus one increment, whereas the absence of an electrical impulse in register 108 means a minus one increment. In these cases, a ΔV of $\pm 1$ is added to the $V_{i-1}$ input on line 141 by the basic incremental adder circuit 105, 106 to produce an output $V_i$ on line 156. When no increment is programmed $V_{i-1}$ remains unchanged, i.e., when "Read ΔV=0, ΔV effectively=0 and $V_i = V_{i-1}$.

The subscript "$i$" as herein used represents the "instant" or "$i$th" minor cycle and subscript "$i-1$" refers to the next preceding minor cycle, so that "$V_i$" means the value of the variable V during the $i$th minor cycle and "$V_{i-1}$" means the value of V during the preceding minor cycle to which ΔV, or more properly, $\Delta V_i$ is added to obtain $V_i$.

Figure 5A:
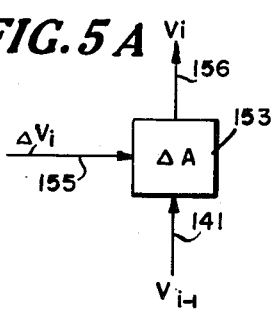
FIGURE 5A is a block symbol of the schematic of FIGURE 5.
Figure 8:
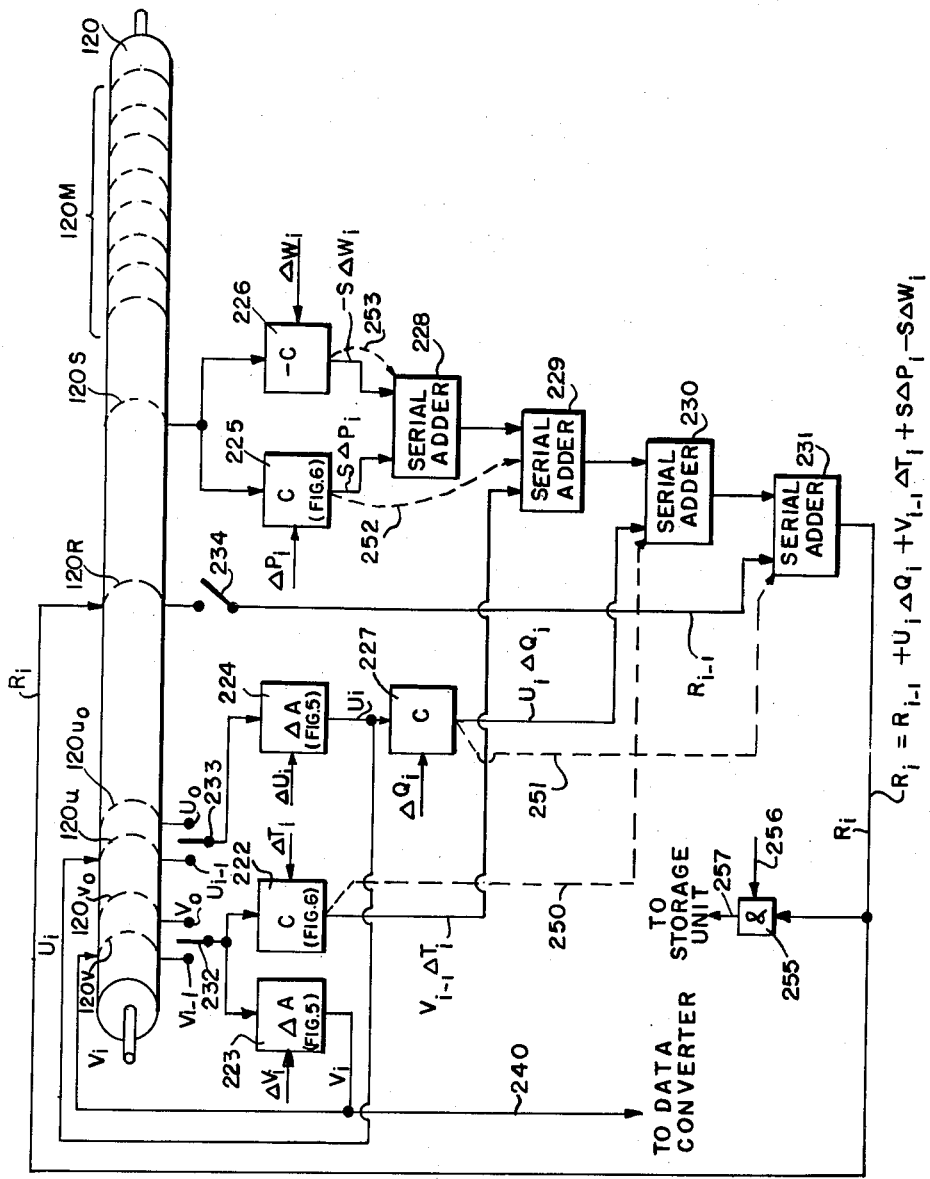
FIGURE 8 illustrates an embodiment of our basic algorithm.

FIGURE 5A represents in block symbol the whole incremental adder illustrated in FIGURE 5 including the basic adder 105, 106 with bit storage registers 107 and 108 as used in FIGURE 8. The function of an incremental adder is to add the effective ΔV increment $\pm 1$ or 0 on lines 142 and 213 of FIGURE 5 to the variable $V_{i-1}$ on line 141. A pulse on line 142 indicates there is an incremental change programmed, while a pulse or lack thereof on line 213 respectively indicates the direction of that change, i.e., whether plus or minus. The "Read ΔV" and "ΔV" input lines for convenience are merged into the $\Delta V_i$ input line 155 in the block symbol of FIGURE 5A for use in FIGURE 8 while the timing signal input lines are diagrammatically disregarded for sake of clarity.

The further arithmetic operation of the adder of FIGURES 5 and 5A may best be explained through the use of logical notations. The letters inside the symbols for magnetic elements represent the information content thereof. For example, the content of element 143 is C when the element is "set" and $\overline{C}$ (NOT C) when the element is "cleared." This is also noted as "1" for set and a "0" for cleared in the case of binary notation.

In FIGURE 5 the circuit within dashed lined box 105 is an exclusive "OR" circuit wherein:

$$V_i = \sum_{n=0}^{n=m} V_n \oplus K_n$$

where "$n$" is the instant digit position of operand $V_{i-1}$, $m$ is the number of digits in the operand, $V_n$ is the value of the $n$th digit position of the operand, $K_n$ is the value of the carry resulting from the addition during the $n-1$ digit position, and $\oplus$ designates the exclusive "OR" logical function. Exclusive "OR" means either input but not both inputs will produce an output. An input on line 141 is the operand while the input provided by core 147 represents the additive carry or the subtractive borrow. The circuit in dash lined box 106 determines the termination of the carry or borrow. In exclusive "OR" circuit 105 both cores 150 and 151 must be set to produce $V_i$ output through "AND" circuit 152. Core 150 is unconditionally set every $\phi 3$ by an input on line 157. The presence of both an input on line 141 and an input from core 147 to "AND" circuit 145 clears core 150 thereby preventing an output therefrom during the following $\phi 1$. Core 151 is set by both or either of the inputs to "OR" circuit 146 and produces an output to "AND" circuit 152 during the following $\phi 1$, and if only one of the inputs is present, core 150 remains set, thus producing an output to "AND" circuit 152 and consequently a $V_i$ output on line 156. If neither input is presented to "OR" circuit 146, core 151 is not set, thus no output therefrom or on line 156.

When an increment is to be added or subtracted from an operand, core 147 is set by the output from register 107 on line 142. Cores 147 and 149 cooperate to form a modified bit register. Thus the impulse from core 147 sets core 149 and the information recirculates until either core is cleared. Thus $K_n$ initially is a series of 1's, then some condition is met and for the remainder of the operand word, $K_n = 0$. The effect of $K_n = 1$ on $V_n$ is to complement each digit while the effect of $K_n = 0$ is to leave $V_n$ unaltered.

Assume $+1$ is to be added to $V_{i-1}$. A series of impulses are presented to "AND" circuit 158 and to "OR" circuit 148' by register 108. An impulse to "OR" circuit 148' clears core 143 which would otherwise set core 144. This prevents an output from core 144 so that core 147 is not cleared thereby during this operation. The condition of making $K_n = 0$ is determined by "AND" circuit 158. The other input to circuit 158 is from core 150. Thus the first "0" in $V_{i-1}$ on line 141 will allow core 150 to remain set, thus core 149 is cleared on the first digit in which $V_n = 0$. Arithmetically, if 1 is added to a binary number, a carry is generated if the LSD (least significant digit) of the augend is a "1" and that carry is propagated up to the first digit position containing a zero. The remaining more significant digits must remain unchanged which is the case when $K_n = 0$.

Now assume $-1$ is to be added to $V_{i-1}$, which is to say, $+1$ is to be subtracted therefrom. Then no impulses are emitted from register 108. As a result "AND" circuit 158 cannot produce an output to clear core 149. Also core 143 is not cleared by an output from register 108. The first digit of $V_{i-1}$ containing a "1" sets core 143 thereby causing $V_{n+1} = 0$. In subtracting a $+1$ from a number, a borrow is required from the next significant digit if the LSD of the minuend is a zero; this borrow is propagated to each succeeding more significant digit until a "1" satisfies the borrow. The remaining most significant digits remain unchanged.

The LSD of $V_{i-1}$ is always changed during either addition or subtraction. In binary arithmetic the reason for this is obvious. Also note that if no impulse is being circulated in register 107, $V_{i-1}$ remains unaltered regardless of the output from register 108.

The effect of the various timing impules on the circuits is as follows: Pulse $$TP_{01}^1$$

clears cores 149 and 143 prior to transfer of data from registers 107 and 108 to circuit 106. This clears out any possible fragments of data from the preceding operation which could effect the computation being initiated. The MSD (most significant digit) of the previous operand, however, may be and is processed by circuit 105 at the same time circuit 106 is being cleared. On $\phi 2$ of the digit period 01 "Read $\Delta V$" is inserted in core 147. Core 211 in register 108 is cleared during $\phi 2$ which is after item 209 has inserted the last impulse representing the $\Delta V$ of the preceding minor cycle into element 106. During $\phi 3$ of this same digit period the new $\Delta V$ is transferred to core 209 by "AND" circuit 208. Increment $\Delta V$ is added to operand $V_{i-1}$ beginning with $\phi 0$ of digit period 02. The LSD of the sum $V_i$ is inserted in the next arithmetic device during $\phi 1$ of digit period 02. The remaining two phases of digit period 02 are necessary to determine whether or not the carry or borrow is to be terminated.

The operation of circuit 106 can be expressed as:

$$K_n = K_{n-1}(\overline{A_{n-1}} + \overline{\Delta V})(\Delta V + \overline{V_{n-1}}) + \text{"Read } \Delta V\text{"}$$
$$\qquad\qquad\qquad 1 \qquad\qquad\qquad 1$$

wherein the plus signs designate "OR" functions and the multiplication signs designate "AND" functions. In the case of $\Delta V = $ "1" (increment is a plus one) the logical expression for circuit 106 reduces to $$K_n = (V_{n-1})(K_{n-1}) + \text{"Read } \Delta V\text{"}$$

since $\overline{A_{n-1}} = (V_{n-1})(K_{n-1})$ ("AND" circuit 145). If $\Delta V = $ "0" (increment is a minus one) the expression reduces to $K_n = (K_{n-1})\overline{(V_{n-1})} + \text{"Read } \Delta V\text{"}$. Combining the logical expressions for items 105 and 106 we obtain:

$$V_i = \sum_{n=0}^{n=m} V_n + K_n.$$

$$= \sum_{n=0}^{n=m} V_n + \{K_{n-1}(\overline{A_{n-1}} + \overline{\Delta V})(\Delta V + \overline{V_{n-1}}) + \text{"Read } \Delta V\text{"}\}$$

Where "Read $\Delta V$" = 0     Case 1

$$V_i = \sum_{n=0}^{n=m} V_n$$

$$= V_{i-1};$$

where "Read $\Delta V$" = 1 and $\Delta V = 1$     Case 2

$$V_i = \sum_{n=0}^{n=m} V_n + \{(V_{n-1})(K_{n-1}) + \text{"Read } \Delta V\text{"}\}$$

$$= V_{i-1} \text{ plus 1, and}$$

where "Read $\Delta V$" = 1 and $\Delta V = 0$     Case 3

$$V_i = \sum_{n=0}^{n=m} V_n + \{\overline{(V_{n-1})}(K_{n-1}) + \text{"Read } \Delta V\text{"}\}$$

$$= V_{i-1} \text{ minus 1.}$$

As an example let $V_{i-1} = 01000101$. The case where "Read $\Delta V$" = 0 is obvious. Where "Read $\Delta V$" = 1 and $\Delta V = 1$, the first or $n=0$ digit position on the right end (so called the $2^0$ digit position) of the resultant $V_i = 0$, as both $V_0$ and "Read $\Delta V$" = 1. Thus, with $\Delta V = 1$ when $$V_{i-1} = 01000101$$
$$K = \qquad\qquad 1$$
$$V_i = \qquad\qquad 0$$

In the $2^1$ digit position $V_1 = 0$; $V_0 = 1$ and $K_{n-1} = 1$, therefore $V_1 = 1$ and $K_1 = 1$, giving $$V_{i-1} = 01000101$$
$$K = \qquad\qquad 11$$
$$V_i = \qquad\qquad 10$$

In the $2^2$ digit position $V_2 = 1$; $V_1 = 1$ and $K_1 = 1$, therefore $$V_{i-1} = 01000101$$
$$K = \qquad\quad 011$$
$$V_i = \qquad\quad 110$$

In all subsequent digit positions $K_n = 0$, therefore $V_i = V_n$ for these digit positions. The final resultant is $V_{i-1}$ plus one.

$$V_{i-1} = 01000101$$
$$K = 00000011$$
$$V_i = 01000110 = V_{i-1} \text{ plus 1}$$

Since there are no provisions for end around carry it is obvious to those skilled in the art that this incremental adder is designed for the 2's complement binary notation. It is also possible to use our invention with the one's complement notation of course with different implementation.

Referring now to FIGURE 6A block symbol 116 represents a complementer C like the one illustrated in FIGURE 6 and as used in FIGURE 8. The complementer performs the function of multiplying an input operand, such as S, on line 161 by a minus or plus one increment by, respectively, merely complementing or not complementing the operand. A complement can be defined as a quantity derived from another quantity by one of the following rules, where "b" is the radix of the quantities: (a) for a complement on "b," subtract each digit of the given quantity from "b−1," add unity to the least significant digit (LSD) and perform all resultant carries; (b) for a complement on "b−1," subtract each digit on the quantity from "b−1." In our computer we use the complement on 2 in the binary system. Rule (a) in a 2's complement binary notation reduces to replacing all 0's with 1's and 1's with 0's, adding 1 to the LSD and performing all resulting carries. We also define the most significant digit (MSD) as a sign digit, that is, a "0" represents a positive number and "1" represents a negative number. Thus complementing a number representation effectively multiplies the number by a minus one. In our implementation of complementing, the carry is added to the complement's LSD in a serial adder following the complementer. This is explained later.

The Read $\Delta P$ register in dash lined box 169 of FIGURE 6 is comparable to register 108 of FIGURE 5. "OR" circuit 272 and cores 274, 276 may be termed a "Read $\Delta P$" Bit Register I, while "AND" circuit 273, "OR" circuit 273' and cores 278, 280 denote a "Read $\Delta P$" Bit Register II. Gated pulse $$TP_{00}^0$$

on line 281 clears core 280 which erases the data in that bit register. In the next clock pulse ($\phi 1$ of digit period 00) the new "Read $\Delta P$" is transferred from Register I to Register II by the coincidence of the output of core 276 and pulse $$TP_{00}^1$$

in "AND" circuit 273. The outputs of core 278 then form a stream of impulses which set core 166 and probe "AND" circuit 160 during $\phi 3$ of each digit period during the minor cycle under consideration. The issuance of impulses from register 169 designates that increment $\Delta P$ has been programmed while absence of impulses therefrom designates that $\Delta P$ has not been programmed.

FIGURE 6 also includes in dash lined box 170 a second circuit comparable to register 108 of FIGURE 5, except that the input is reversed and inhibitory, that is, an impulse will inhibit an output and no impulse will be transferred by "AND" circuit 266, while no input will cause an impulse to be transferred. This change can be called complementation. A stream of impulses on output line 162 represents $\Delta P = 0$ and no impulses thereon represents $\Delta P = 1$ in an increment, the complementation effects a change of sign. To "clear" data $\Delta P$ from $\Delta P$ bit register I (which includes "OR" circuit 263, cores 264, 265 and "AND" circuit 266), pulse $$TP^1_{02}$$

is applied to "OR" circuit 263 by line 261 which causes element 264 to be set so a pulse will circulate between cores 264 and 265. The timing pulse, as may be noted, occurs during the first clock phase after $\phi 3$ of period 01 at which time data was transferred to $\Delta P$ bit register II ("OR" circuit 268 and cores 267, 269) and to "AND" circuit 160. This makes core 264 available to receive data for the following minor cycle starting with $\phi 2$ of digit period 02 and is available up to $\phi 3$ of digit period 01 of the next minor cycle at which time the data is transferred by "AND" circuit 266. The availability of each bit register is governed by similar rules, that is, the register is available for data insertion between clearing and read out.

In FIGURE 6 "OR" circuit 163, "AND" circuits 164, 168 and cores 165, 166 of the complementer form an exclusive OR function of the input variable S on line 161 and the incremental multiplier $\Delta P$ as present on input line 162. The circuit operates in a manner similar to circuit 105 of FIGURE 5. When the direction of the increment is represented in the machine as a "0" (cleared state) the increment is a minus one (the machine only considers integers). Thus when impulses are present on line 162 the input on line 161, operand S, should be complemented; however, with no impulses on line 162, the input on line 161 should remain unchanged. This is accomplished by the exclusive "OR" circuit (either input but not both inputs produces an output). Core 165 is set through "OR" function 163 by inputs on either line 161 or 162, while core 166 remains set unless there are inputs on both lines 161 and 162. When a "Read $\Delta P$" signal has been received by register 169, core 166 is unconditionally set for each digit of operand S via input line 167. To obtain a "1" output from "AND" function 168, both cores 165 and 166 must be set. "AND" circuit 160 provides the carry to a serial adder at the beginning of each operand digit. When the increment ($\Delta P$) is transferred to core 267, the output of core 264 is also sent to "AND" circuit 160 where in cooperation with a timing pulse $$TP^3_{01}$$

and an output from register 169, an impulse is formed representing on line 117 an arithmetic carry. With an input to line 162, S is not completed and no carry is sent to a serial adder; without an input on line 162, S is complemented and a carry is sent to an adder for addition at a subsequent time as explained in FIGURE 7. Circuit 171 is the heart of the complementer with registers 169 and 170 being the incremental input registers. Of course, a carry can occur only when an increment is programmed.

A possible ancillary operation of the complementer is to change the sign of the incremental input $\Delta P$. The output of the complementer 116 of FIGURE 6A then would be $-S\Delta P$ instead of $S\Delta P$. This sign change would alter the interpretation of $\Delta P$ from a plus one to a minus one, or vice versa, and requires no carries to be added. Changing the sign of $\Delta P$ can be accomplished by merely replacing register 170 with a circuit like register 169. Then impulse on line 162 represents a plus one increment. The input operand is then complemented as previously explained. Thus the plus one increment operates as a minus one increment, and vice versa. In FIGURE 8 complementer 226 is such a complementer and is so indicated by a minus sign before the "C" in the box symbol.

In some complementers it is desirable to provide only the direction of increment change; hence the "Read $\Delta P$" register 169 is omitted. Then the effect of not programming an incremental change would be to provide a constant minus one increment (instead of a zero). "AND" circuit 160 then has only two inputs, one from register 170 and the other from a gated timing pulse similar to the one illustrated. Core 166 under such circumstances is unconditionally set during each digit period by a clock phase. This removes the requirement for a programmed increment to produce an output. In FIGURE 8 items 226 and 227 are complementers of this type.

Referring now to FIGURE 7 which illustrates an exemplary serial adder, line 172 is a carry input line from a complementer such as the one shown in FIGURE 6; i.e., the output of "AND" circuit 160 of FIGURE 6 may be connected to 172 of FIGURE 7. The carry impulse sets core 187 through "OR" circuit 173. The output of core 187 cooperates with $U_n$ and $V_n$ variable operand inputs on lines 180 and 181, respectively, to provide the LSD of the adder sum. A pulse $$TP^3_{01}$$

clears core 188 at the same time as a complementer carry is received on line 172. This clears out any carry that could be left over from the preceding computation.

The operation of the circuit of FIGURE 7 is in all other respects the operation of a typical serial binary adder which is easily expressed by logical notation as:

$$S_n = (U_n + V_n + K_{n-1})\overline{K}_n + K_{n-1}U_nV_n, \text{ and}$$
$$K_n = U_nV_n + U_nK_{n-1} + V_nK_{n-1}$$

where the plus signs designate logical "OR" functions, the multiplication designates logical "AND" functions, $n$ designates the digit position, S is the digit sum, K is the digit carry, and U and V are input operands. In the case where $n=0$ ($2^0$ digit position), $K_{n-1}$ is the carry from a complementer. In all other respects it is a typical three-input serial adder which is understood by those skilled in the art.

In FIGURE 7 the digit carry circuits including "AND" circuits 182, 183, 184, "OR" circuit 185, and core 186 determine the adder digit carry ($K_n$) which is inserted in core 188. "OR" circuits 189, 193, "AND" circuit 191 and cores 190, 192 together with the digit carry circuit determine the digit sum ($S_n$) which is inserted in core 194.

In FIGURE 7A the block symbol 195 represents a serial adder such as the one illustrated in FIGURE 7 and is so used in FIGURE 8. The dash line 172 is the carry input line from a complementer, while the two input lines 180, 181 carry the $U_n$ and $V_n$ digits to be summed.

The above described arithmetic devices are connected together as shown in FIGURE 8. The operands U, V, S, and R are represented by streams of impulses read off of storage drum 120. During each digit period the data is transferred from one arithmetic device into another. These transfers are continuous even though no operations are being performed. Vacant spaces in the operand tracks 120V, 120U, 120S, 120R are usually filled with 0's. If one operation is being performed during each minor cycle one operand follows the previous operand as a continuous stream of coded impulses. The computer separates the operands by the use of an electrically encoded command "Initiate Minor Cycle" obtained from section 120M on the drum as later explained. This command inserts an impulse in the shift register of FIGURE 3. The gated timing pulse from this shift register clear out the arithmetic devices and insert new data in a pre-wired fixed sequence. No time is sacrificed to perform the changes in incremental and operand values. Specific examples of some of these changes are illustrated in FIGURES 5 through 7.

The incremental values are inserted in the proper bit registers during the preceding minor cycle by machine operations which are independent of the arithmetic operations. The manner of execution of such operations is later explained in connection with FIGURES 9, 10, and 11. The streams of electrical impulses on the storage drum are physically displaced an integral number of digit periods so as to be read out during the proper digit period. Thus each digit of the four operands is always read from the drum during clock phase zero.

The exemplary incremental adder of FIGURE 5 may be used as incremental adder 223 of FIGURE 8. The output of this incremental adder is transmitted over line 240 to data converter 127 (shown in FIGURE 1) and to the magnetic storage drum for recirculation to become $V_{i-1}$ in the next major cycle of computation in the corresponding minor cycle. Incremental adder 224 may also be like the one in FIGURE 5 and operates in a manner similar to adder 223 but is timed by different clock phases. For example, the output of adder 223 may be during $\phi 1$, while the output of adder 224 is during $\phi 0$. Thus the operation of adder 224 is advanced one clock phase with respect to adder 223. The outputs of adder 224 are transmitted to complementer 227 and to drum track 120U.

The exemplary complementer illustrated in FIGURE 6 may be used as complementer 225 of FIGURE 8. The carry from this complementer is applied, as indicated by dash line 252, to serial adder 229 which may be the exemplary adder illustrated in FIGURE 7. Similarly dash lines 250, 251, and 253 designate carry transmission lines from other complementers to other serial adders. The carry transmission circuits are identical except they may use different clock phases for timing. The carry determinating "AND" circuit 160 of FIGURE 6 will have only two inputs for complementers 226 and 227 of FIGURE 8 as previously explained.

The serial outputs of adders 228, 229, and 230 form serial inputs to successive serial adders 229, 230, and 231, respectively. The clock phase of these outputs is the same as the clock phase of the inputs to the next serial adder which is always $\phi 1$. The output of serial adder 231 represents the computed relationship of variables in equations designated by the computer program of machine commands. This relationship is called an error function and is designated $R_i$ as is the single line upon which it appears in FIGURE 8 for storage in the single R line or register on drum track 120R. The error function or remainder is recirculated through magnetic drum track 120R to be used in the next major cycle to compute a new error function or remainder for the same equation. "AND" circuit 255 gates the last digit (MSD) of the output from serial adder 231 as the sign digit. A gated timing pulse from the shift register in FIGURE 4 probes "AND" circuit 255 over line 256 during $\phi 1$ of digit period 04 thereby transmitting the sign of $R_i$ over line 257 for storage in the memory unit 124 of FIGURE 1. The sign digit of $R_i$ is used to determine increments in other equations and an increment (usually $\Delta W_i$) in the same equation in the next major cycle of computation.

The function of the above described circuits as an arithmetic unit is more aptly described through the media of mathematical notations. The described circuits provide but one means of implementing the techniques of our invention.

*Basic Algorithm*

Our mechanization of incremental techniques is accomplished by defining a basic algorithm around which other algorithm can be constructed by a program of electrically encoded commands. Some of the algorithms which can be programmed are incremental addition, incremental subtraction, incremental integration, incremental multiplication, incremental division, incremental logarithms and incremental exponentials. Incremental operations differ from regular mathematical operations in that the complete function is never solved. The operations merely relate outputs to inputs, that is, the outputs vary as a specified function of an input or multiplicity of inputs. Thus initial values of inputs, outputs and intermediate numbers must be inserted in the computer prior to computation.

By restricting the change in each variable within the computer to a change in the least significant digit (LSD) each major cycle, the above mentioned incremental operations can be accomplished by addition or subtraction. For a machine handling only integers, this means a change of $\pm 1$ each major cycle. The size of the increment usually should be small enough with respect to the size of the operand so that an error equal to the size of the increment would be negligible in the output. This implies the operands change a negligible amount each major cycle. This further implies that to obtain satisfactory control the response time of the process being controlled must be much longer than a major cycle time. For our first implementation a process having a time constant in the magnitude of seconds can be satisfactorily controlled. The practical limit of the accuracy of numerical solutions is the time required to effect the changes in the variables.

An incremental computation may be performed in each minor cycle which modifies one or more operands pursuant to an algorithm by incrementally changing both independent and dependent variables. This change in the variables can be called updating.

Three machine numbers (represented as three streams of impulses) designated as R, U, and V may be processed in the arithmetic section 126 of FIGURE 1 during each minor cycle. They are modified according to the following equations which represent the operation of our new basic algorithm.

(1) $\quad U_i = U_{i-1} + \Delta U_i$
(2) $\quad V_i = V_{i-1} + \Delta V_i$
(3) $\quad R_i = R_{i-1} + U_i \Delta Q_i + V_{i-1} \Delta T_i + S \Delta P_i - S \Delta W_i$ The subscript $i$ denotes the $i$th major cycle of computation and Greek letter $\Delta$ denotes an incremental value of an operand; for example, $\Delta V_i$ is the increment (a change in LSD) of operand V in the $i$th major cycle. The basic algorithm is illustrated in block diagram form in FIGURE 8. Incremental adder 224 solves Equation 1, incremental adder 223 solves Equation 2, while the complementers 222, 225, 226 and 227 with serial adders 228, 229, 230 and 231 solve Equation 3. Each carry generated in a complementer consists of an impulse which is inserted as indicated by dash lines 250, 251, 252 and 253, respectively, into a serial adder (in a manner such as shown in FIGURE 7) just preceding the arrival of the operands to that serial adder so that the carry is effectively added to the LSD of the operand which except for $R_{i-1}$ to adder 231 is a complemented number.

To insert initial values in the beginning of a new series of computational cycles, switches 232 and 233 are switched in the $V_o$ and $U_o$ positions respectively and switch 234 is opened. $V_o$ and $U_o$ are constants which for the incremental operation to be performed produce a zero error function $R_o$. The normal position for switches 232 and 233 is in the $V_{i-1}$, $U_{i-1}$ closed position, while switch 234 is closed.

Each track on drum 120 has one type of data associated therewith; i.e., track 120R provides a single delay line type storage for the error functions or remainders, track 120S stores the scaling constants S, track $120U_o$ stores the initial values of U, track 120U provides delay line type storage for variables U, track $120V_o$ stores initial values of V and track 120V provides delay line type storage for variables V. Numeral 120M designates all other tracks on the drum not associated directly with our basic algorism.

The incremental values used in the algorithm are selected by the electrically encoded program commands. This selection or sequence of selections provides modifications of the basic algorithm yielding the basic operations of the machine, such as, incremental scaled multiplication.

The sum produced by incremental adder 223, $V_i$, is recirculated through track 120V to become $V_{i-1}$ in the corresponding minor cycle of the $i+1$ major cycle and is sent to the data convertor for comparison with an analog input or output. In our computer a program command from one of tracks 120M causes a comparison to be initiated via control unit 123 (see FIGURE 1). Thus each $V_i$ is not necessarily compared with an analog value.

Similarly, the sum produced by incremental adder 224, $U_i$, is recirculated through the drum storage system on track 120U to become $U_{i-1}$ in the $i+1$ major cycle. This sum is also combined with other values in the serial adders as shown to form a new error function or remainder $R_i$ as expressed by Equation 3. This newly computed error function is likewise recirculated through the storage drum on track 120R to become error function or remainder $R_{i-1}$ in the $i+1$ major cycle provided a new problem is not initiated. Other factors contributing to the newly computed error function are the scale factor S, previous error function $R_{i-1}$ and the incremental values $\Delta T_i$, $\Delta U_i$, $\Delta P_i$ and $\Delta W_i$ as selected by the computer program of commands. The sign digit which is the most significant digit (MSD) of $R_i$ is transmitted to the magnetic core high speed storage 124 for future reference in determining certain incremental values as noted in the explanation of machine operations.

Machine Operations

Algorithms for arithmetic and other processes are obtained from the basic algorithm, as expressed by Equations 1, 2, and 3, by restricting certain operands and increments and by inserting proper initial values. These functions are performed by logical switching networks similar to those described in connection with FIGURE 2. In all cases the initial error function or remainder $R_0=0$. Further, it is to be noted that in implementing each of the following incremental computations, there needs to be but one register or line for storing any remainder $R_i$, this being, in the exemplary apparatus of FIGURE 8, on drum track 120R.

In incremental ADDITION and SUBTRACTION the desired general equation for solution is:

(4) $\qquad W=(SP+U_oQ+V_oT)/S$

The quantities S, $U_o$, and $V_o$ can be positive or negative. To obtain such an equation, increments are restricted as follows:

(5) $\qquad \Delta U_i = \Delta V_i = 0$ while the initial conditions are (6) $\qquad SW_o = SP_o + U_oQ_o + V_oT_o$ The increment $\Delta W_{i+1}$ is caused by the sign digit (MSD) of $R_i$ via "AND" circuit 255 (FIGURE 8) to be a plus one for $R_i$ positive and a minus one for $R_i$ negative when, as is the usual case, scale factor S (a constant) is positive, but if S is made negative the signs of the increment are reversed. The computer is programmed so that the output increment of the $i$th cycle becomes $\Delta W_{i+1}$ in the corresponding minor cycle of the $i+1$ major cycle. Substituting the restricted values from Equation 5 in Equation 3 and using initial values for variable U and V gives equation (8) $\qquad R_i = R_{i-1} + U_o\Delta Q_i + V_o\Delta T_i + S\Delta P_i - S\Delta W_i$ Summing over $k$ major cycles:

(9)
$$\sum_{i=1}^{k}(R_i-R_{i-1}) = U_o\sum_{i=1}^{k}\Delta Q_i + V_o\sum_{i=1}^{k}\Delta T_i + S\sum_{i=1}^{k}\Delta P_i - S\sum_{i=1}^{k}\Delta W_i$$

and

(10)
$$R_k - R_0 = U_oQ_k - U_oQ_o + V_oT_k - V_oT_o + SP_k - SP_o - SW_k + SW_o$$

Substituting the value of $SW_o$ from Equation 6 which expresses the initial conditions into Equation 10 and recalling $R_0=0$, gives:

(11) $\qquad SW_k + R_k = U_oQ_k + V_oT_k + SP_k$ which divided by S is:

(12) $\qquad W_k + R_k/S = (SP_k + U_oQ_k + V_oT_k)/S$

Equation 12 the computed sum is equivalent to Equation 4 the desired sum whenever the "round off" error $R_k/S$ is negligible. It can be shown that W is either within $\pm 1$ of the correct solution or is in transition at its maximum rate toward the correct solution.

The desired general equation for MULTIPLICATION is:

(13) $\qquad W=(UV+SP)/S=UV/S+P$

The quantities U, V, and P are independent variables and the quantity S is any positive or negative constant. To obtain such an equation, the operands and increments are restricted as follows:

(14) $\qquad \Delta Q_i = \Delta V_i$

(15) $\qquad \Delta T_i = \Delta U_i$

(16) $\qquad R_0 = 0$

(17) $\qquad SW_o = U_oV_o + SP_o$ (initial conditions)

(18) $\qquad \Delta W_{i+1} = \begin{cases} +1, \text{ for } R_i \text{ positive} \\ -1, \text{ for } R_i \text{ negative} \end{cases}$ The sign of $\Delta W_{i+1}$ is reversed when S is negative. Increment $\Delta W_{i+1}$ is programmed as the incremental output of this machine operation.

Substituting Equations 14 and 15 in Equation 3 gives:

(19) $\quad R_i = R_{i-1} + U_i\Delta V_i + V_{i-1}\Delta U_i + S\Delta P_i - S\Delta W_i$ and since

(20)
$$\Delta(U_iV_i) = U_iV_i - U_{i-1}V_{i-1}$$
$$= (U_{i-1}+\Delta U_i)(V_{i-1}+\Delta V_i) - U_{i-1}V_{i-1}$$
$$= V_{i-1}\Delta U_i + U_{i-1}\Delta V_i + \Delta U_i\Delta V_i$$
$$= V_{i-1}\Delta U_i + U_i\Delta V_i$$

Substituting Equation 20 in Equation 19:

(21) $\qquad R_i - R_{i-1} = \Delta(U_iV_i) + S\Delta P_i - S\Delta W_i$

Summing over K major cycles of computation:

(22)
$$\sum_{i=1}^{k}(R_i-R_{i-1}) = \sum_{i=1}^{k}\Delta(U_iV_i) + \sum_{i=1}^{k}\Delta P_i - S\sum_{i=1}^{k}\Delta W_i$$

(23) $\qquad R_k - R_0 = U_kV_k - U_oV_o + SP_k - SP_o - SW_k + SW_o$

Substituting the value of $SW_o$ from Equation 17 into Equation 23 and recalling $R_0=0$ gives:

(24) $\qquad SW_k + R_k = U_kV_k + SP_k$

(25) $\qquad W_k + R_k/S = (U_kV_k + SP_k)/S$

Equation 25 the machine product is equivalent to Equation 13 the desired product whenever the round of error $R_k/S$ is negligible. As in the case of addition, it can be shown that W is either within $\pm 1$ of the correct value or is in transition at its maximum rate toward the correct solution.

The desired general equation for incremental DIVISION is:

(26) $\qquad U=(SW-SP)/V$

The quantities W, P, and V are independent variables, the quantity S a scaling constant, and the quantity U is the dependent variable. The correct algebraic sign must be assigned to the quantity V as an initial value since the dependent variable U becomes infinite as V goes through zero.

The operands and increments are restricted as follows:

(27) $\quad \Delta Q_i = \Delta V_i$

(28) $\quad \Delta T_i = \Delta U_i$

(29) $\quad R_o = 0$

(30) $\quad U_o V_o = SW_o - SP_o$ (initial conditions)

(30a) $\Delta W_{i+1} = +1$ for $R_i$ positive and $-1$ for $R_i$ negative when $S$ is positive; signs reversed when $S$ is negative.

$$\Delta U_{i+1} = \begin{cases} +1, \text{ for } R_i \text{ positive and } V_i \text{ negative} \\ +1, \text{ for } R_i \text{ negative and } V_i \text{ positive} \\ -1, \text{ for } R_i \text{ positive and } V_i \text{ positive} \\ -1, \text{ for } R_i \text{ negative and } V_i \text{ negative} \end{cases}$$

Increment $\Delta U_{i+1}$ is programmed to be the output increment of this operation. Since variable V never undergoes a change of sign, for valid operations the sign of $V_i$ is always known.

Except for the choice of dependent variable, the divide algorism is the same as the multiply algorism. The derivation of the basic expression follows the same proof from Equation 19 to Equation 24, above and the latter equation is now stated again.

(24) $\quad SW_k + R_k = U_k V_k + SP_k$

Solving for $U_k$:

(32) $\quad U_k = (SW + R_k - SP_k)/V_k$

Equation 32 the machine quotient is equivalent to Equation 26 the desired quotient whenever $R_k$ can be neglected. As in the case of multiplication, it can be shown that $U_k$ is either within $+1$ of the correct solution or is in transition at its maximum rate toward the correct solution.

The desired general equation for SQUARE ROOT is:

(33) $\quad U = \sqrt{SW - SP}$

The quantities W and P are independent variables, S is a scaling constant, and U is the dependent variable.

The operands and increments are restricted as follows:

(34) $\quad V_o = U_o$

(35) $\quad \Delta Q_i = \Delta T_i = \Delta V_i = \Delta U_i$

(36) $\quad R_o = 0$

(37) $\quad U_o^2 = SW_o - SP_o$ (initial conditions)

(37a) $\Delta W_{i+1} = +1$ for $R_i$ positive and $-1$ for $R_i$ negative when $S$ is positive; signs reversed when $S$ is negative.

(38) $\quad \Delta U_{i+1} = \begin{cases} +1, \text{ for } R_i \text{ negative} \\ -1, \text{ for } R_i \text{ positive} \end{cases}$ Increment $\Delta U_{i+1}$ is programmed to be the output increment of this operation. If $SW - SP$ is negative, the signs $\Delta V_i$ and $\Delta Q_i$ are reversed; that is, $\Delta V_i = \Delta U_i = -\Delta T_i = -\Delta Q_i$ and $U = \sqrt{|SW - SP|}$ Substituting Equations 34 and 35 in Equation 3:

(39) $\quad R_i = R_{i-1} + U_i \Delta U_i + U_{i-1} \Delta U_i + S\Delta P_i - S\Delta W_i$ and since

(40) $\quad \Delta(U_i^2) = U_i^2 - U_{i-1}^2$
$= (U_{i-1} + \Delta U_i)^2 - U_{i-1}^2$
$= U_{i-1}\Delta U_i + U_{i-1}\Delta U_i + \Delta U_i \Delta U_i$
$= U_{i-1}\Delta U_i + U_i \Delta U_i$ Substituting Equation 40 in Equation 39 gives:

(41) $\quad R_i - R_{i-1} = \Delta(U_i^2) + S\Delta P_i - S\Delta W_i$

Summing over $k$ major cycles:

(42) $\quad \sum_{i=1}^{k}(R_i - R_{i-1}) = \sum_{i=1}^{k}\Delta(U_i^2) + S\sum_{i=1}^{k}\Delta P_i - S\sum_{i=1}^{k}\Delta W_i$

(43) $\quad R_k - R_0 = U_k^2 - U_0^2 + SP_k - SP_o - SW_k + SW_o$

Combining Equations 37 and 43:

(44) $\quad R_k = U_k^2 + SP_k - SW_k$

(45) $\quad U_k = \sqrt{SW_k - SP_k + R_k}$

Equation 45 the computed square root is equivalent to Equation 33 the desired square root whenever $R_k$ can be neglected. The same remarks apply to $U_k$ as in division.

The above operations all produce results without approximation and are referred to as exact solutions. The remainder of the operations set forth below are based on trapezoidal integration with increments corresponding to the least count of the independent variable. Therefore, they represent the desired solution only to the extent that the finite sum represents the true integral.

The equation for INTEGRATION is:

(46) $\quad W = 2/S \int U dQ$

The approximation for integration is represented in the following expression for the $k^{th}$ major cycle of computation.

(47) $\quad W_k = 2/S \sum_{i=1}^{k} \frac{1}{2}(U_i + U_{i-1})\Delta Q_i \cong 2/S \int U dQ$ The algorism for integration restricts the operands as shown below.

(48) $\quad V_o = U_o$

(49) $\quad \Delta V_i = \Delta U_i$

(50) $\quad \Delta T_i = \Delta Q_i$

(51) $\quad R_o = P_o = \Delta P_i = 0$

(52) $W_o$ = desired value for integral with $Q = Q_o$.

(53) $\quad \Delta W_{i+1} = \begin{cases} +1, \text{ for } R_i \text{ positive} \\ -1, \text{ for } R_i \text{ negative} \end{cases}$ Increment $\Delta W_{i+1}$ is programmed to be the ouput increment of this operation. When $S$ is negative the sign of $\Delta W_{i+1}$ is reversed.

Substituting Equations 48, 49, and 50 in Equation 3:

(54) $\quad R_i = R_{i-1} + U_i \Delta Q_i + U_{i-1}\Delta Q_i - S\Delta W_i$

Summing over $k$ major cycles of computation:

(55) $\quad \sum_{i=1}^{k}(R_i - R_{i-1}) = \sum_{i=1}^{k}(U_i + U_{i-1})\Delta Q_i - S\sum_{i=1}^{k}\Delta W_i$

(56) $\quad R_k - R_0 = 2\sum_{i=1}^{k}\frac{1}{2}(U_i + U_{i-1})\Delta Q_i - SW_k + SW_o$

(57) $\quad W_k + R_k/S = 2/S\sum_{i=1}^{k}\frac{1}{2}(U_i + U_{i-1})\Delta Q_i + W_o$ Equation 57 the machine computed integral represents the desired integral as described in Equation 47 except for the round off error term $R_k/S$ which is minimized as in the previous operations.

The desired equation for INTEGRATION of a RECIPROCAL INTEGRAND is:

(65) $\quad Q = \frac{1}{2}S\int dW/U$

Integration of a second form with a reciprocal integrand can be obtained by solving the following equation for Q.

$$U = \tfrac{1}{2} S dW/dQ$$
$$dQ = \tfrac{1}{2} S dW/U$$
(66) $\quad Q = \int dQ = S/2 \int dW/U$ This form is obtained by restricting the operands in the general machine algorithm as listed below.

(67) $\qquad V_o = U_o$

(68) $\qquad \Delta V_i = \Delta U_i$

(69) $\qquad \Delta T_i = \Delta Q_i$

(70) $\qquad R_o = P_o = \Delta P_i = 0$

(71) $\quad Q_o =$ value of the integral for the initial conditions (71a) $\Delta W_{i+1} = +1$ for $R_i$ positive and $-1$ for $R_i$ negative when S is positive; signs reversed when S is negative.

(72) $\qquad \Delta Q_{i+1} = \begin{cases} +1, \text{ for } R_i \text{ negative} \\ -1, \text{ for } R_i \text{ positive} \end{cases}$ Except for the choice of independent and dependent variables, this algorithm is the same as that for the first integration form.

Substituting Equation 68 and Equation 69 in Equation 3:

(72a) $\quad R_i = R_{i-1} + U_i \Delta Q_i + U_{i-1} \Delta Q_i - S \Delta W_i$ (72b) $\quad \Delta Q_i = (S \Delta W_i + R_i - R_{i-1})/(U_i + U_{i-1})$ Summing over $k$ major cycles of computations, (72c)
$$Q_k - Q_o = S \sum_{i=1}^{k} (\Delta W_i)/(U_i + U_{i-1}) + \sum_{i=1}^{k} (R_i - R_{i-1})/(U_i + U_{i-1})$$

Neglecting the effect of the R's (error functions=0) in Equation 72c, the machine computed integral represents the integral of Equation 65.

The sign of $\Delta Q_{i+1}$ is reversed if $U_i$ is negative. The sign of U never changes as it is the denominator in Equation 65. $\Delta Q_{i+1}$ is programmed to be the output increment of this operation.

The desired general equation for the LOGARITHM is:

(73) $\qquad Q = S/2 \, \text{Log}_e \, W$

The basic relationship shown above may be obtained from expression 65 by equating the quantities U and W.

(65) $\qquad Q = \tfrac{1}{2} S \int dW/W$
$\qquad\qquad = \tfrac{1}{2} S \, \text{Log}_e \, W$ The restrictions placed on the operands in the basic machine algorism are listed below for this condition.

(74) $\qquad V_o = U_o = W_o$

(75) $\qquad \Delta V_i = \Delta U_i = \Delta W_i$

(76) $\qquad \Delta T_i = \Delta Q_i$

(77) $\qquad R_o = P_o = \Delta P_i = 0$

(78) $\quad Q_o =$ value of the logarithm for the initial conditions (78a) $\Delta W_{i+1} = +1$ for $R_i$ positive and $-1$ for $R_i$ negative when S is positive; signs reversed when S is negative.

(79) $\qquad \Delta Q_{i+1} = \begin{cases} +1, \text{ for } R_i \text{ negative} \\ -1, \text{ for } R_i \text{ positive} \end{cases}$ The sign of $Q_{i+1}$ is reversed if $W_i$ is negative. The sign of W cannot change for a valid computation. $Q_{i+1}$ is programmed to be the output increment of this operation. This algorithm is a special case of Equation 65.

The desired equation for an EXPONENTIAL is:

(80) $\qquad W = e^{2Q/S}$

The basic relationship shown above may be obtained by solving Equation 73 for W.

(73) $\qquad Q = \tfrac{1}{2} S \, \text{Log}_e \, W$
$\qquad\qquad 2Q/S = \text{Log}_e \, W$

(81) $\qquad e^{2Q/S} = W$

The restrictions placed on the operands in the machine algorism are the same for this condition as for the logarithm operation. The dependent variable in this case is chosen as W instead of Q.

(82) $\qquad \Delta W_{i+1} = \begin{cases} +1, \text{ for } R_i \text{ positive} \\ -1, \text{ for } R_i \text{ negative} \end{cases}$ The sign of $\Delta W_{i+1}$ is reversed if S is negative. Increment $\Delta W_{i+1}$ is programmed to be the output increment of this operation.

Other basic operations can be generated from the machine algorism than are presented here. Among these are a number of operations based on rectangular (rather than trapezoidal) approximations to integration. The basic machine algorism as it stands, for example, would yield the result shown below. The expression could be solved for any one of the variables in terms of the others.

(83) $\qquad W = P + 1/S \int U dQ + 1/S \int V dT$

In addition to straightforward solutions in which the unknown quantity is isolated, the incremental method of computation is particularly useful for implicit solutions. In such a solution the implicit function of the dependent variable is equated to zero as shown below.

(84) $\qquad F(x) = 0$

The function, $F(x)$, is computed with basic operations using the value of the dependent variable from the last major cycle of computation. In the final operation for determining $F(x)$ the result is left at zero and the sign of $R_1$ used to modify the implicit variable, $x$, rather than the solution of the last basic operation. In such a case the basic operation is used as a servo similar to analog equipment.

*Errors In Machine Computation*

In digital incremental computers there are generally three types of errors, namely; program errors, round off errors, and drift.

The incremental function generated by the incremental computer may not coincide with the function for which the program was designed. The difference between the desired answer and the computed answer is called program error. This error is a function of the human programming, the computer, and the quality of machine operations available for use.

Round off error is caused in any digital computer when the quantity handled exceeds the modulus of machine capability. In the digital incremental computer this round off error in computer inputs is usually no greater than plus or minus one and is slightly more on output quantities even assuming the computer is following the transient conditions properly. The computer increments must be as large as a transient occurring in one major cycle to enable the computer to follow all changes in variables. By proper design this error can be kept very small.

The round off error of outputs from addition, subtraction, multiplication, and integration steps is the term $R_k/S$ in the $k$th major cycle. This value is usually less than unity, but it can become as large as three even when the computer is properly following the inputs. To keep this error small the answer should be as large as possible with respect to the possible error. For addition and subtraction the quantity $SP + U_o Q + V_o W/S$ should be kept as large as possible. Likewise for multiplication $UV/S + P$, and for integration $(2/S) \int U dQ$ must be kept as large as possible. The quantity S is the only quantity adjustable to accomplish this. Thus scale factor S should be just large enough to allow the computer to keep up with the changes.

In the "exact" operations round off is the only appreciable error occurring. The round off value is not discarded, but is retained to minimize this error. The round off error thus is from the final round off.

In operations using integration, error called "drift" occurs which is the accumulation of round off errors. Drift error can be compared to drift occurring in analog integrators due to errors in instrumentation. In analog devices the direction of drift (whether plus or minus) usually is consistent. In digital integrations the errors are likely to be of opposite signs and thus tend to cancel. Drift is then either predictable or not predictable, that is either systematic or random. The former can be compensated for in the algorithms while the latter is usually negligible.

Simple Machine Operation

How our computer executes an incremental operation is illustrated in FIGURES 9, 10, and 11. To understand fully the functions performed, more detailed background of our embodiment is given. Referring for a moment to FIGURE 11 which encompasses FIGURES 11A and 11B, tracks 120M on magnetic storage drum 120 in FIGURE 11B furnish the control electrical impulses to the computer. Track T actually is two physical tracks. One of these tracks has a polarized magnetic spot in each possible digit position which identifies the peripheral location of all digit positions on the drum and indicates to clock 119 the beginning of a new digit period. The length of a digit period is a function of recording density and drum surface speed. This time also determines the maximum rate of data transfer in the computer. Electrical impulses derived from these polarized magnetic spots are used to time all circuits in the computer providing complete circuit synchronism. Each derived pulse generates three additional pulses providing a total of four electrical timing impulses occurring respectively during time periods $\phi 0$, $\phi 1$, $\phi 2$, and $\phi 3$ per digit period, as heretofore explained. The other physical track has only one magnetized spot. This spot provides descrete identification of all magnetizable spots on the drum. It may be used to identify the initiation of a new major cycle of computation; in one embodiment, however, this latter track is used only in loading the computer.

The tracks $2^0$ through $2^6$ are read simultaneously in each peripheral position to form a seven-bit binary code indicating a machine command or address. A method of decoding or translating these impulses is described later in connection with FIGURE 12.

A minor cycle has no definite restraints except hardware (electrical circuit timing) limitations. The length and function of each individual minor cycle is programmed. The length of a minor cycle in digit periods is usually twice the significance of the operands U, V, and S and equal to the significance of error function R. In our first embodiment it is possible that one minor cycle be equal to one major cycle in a minimal program or almost 500 minor cycles at the other extreme. Once a minor cycle is initiated by the computer program, it continues until a new minor cycle or a new major cycle is initiated. For example, if a particular program of commands occupies about one-half the periphery of the magnetic storage drum, the second half of the drum is considered a part of the last minor cycle even though all computation has been completed. In constructing such a program the second half of the drum usually would contain all command codes indicating "no action."

Usually in any one minor cycle no machine operation is ever completed. In our first embodiment only a comparison of an input or output quantity with a computed number can be accomplished in one minor cycle (but usually covers two minor cycles). Each arithmetic operation utilizing the basic algorithm requires three successive minor cycles. The first of the three minor cycles is termed the *preparation* cycle, since during this time the binary pulses representing the required incremental operands having effective values of 0 or ±1 as programmed are transferred to the arithmetic unit 126 from the command translator and control unit 123 and storage unit 124. These transfers, as noted previously, effect the computation in the arithmetic unit of FIGURE 8. Upon completion of this minor cycle all incremental values are usually in the arithmetic unit. The second of the three successive minor cycles is termed the *computation* cycle. In this cycle the basic algorithm is performed using the programmed incremental values to modify the variables pursuant to the desired functional relationship. In the embodiment FIGURE 8, it takes five digit periods before the LSD is processed through all of the arithmetic circuits after it is read off the drum. Likewise there is a delay of five digit periods before the last digit (MSD) is processed from the drum through serial added 231. Thus, assuming an 18 digit word for $R_i$ for example, the last output of the arithmetic section always lags the initiation of a new minor cycle by five digit periods. The incremental result, $\Delta$, of any incremental computation, even when $R_i$ is less than 18 digits, is always programmed, however, so as not to be available until the minor cycle following the actual computation. During the sixth digit period (05) of this third cycle the incremental results of the previous minor cycle are stored in the storage unit 124 if a digit (storage) address is programmed at this point. If a digit address is not programmed the increment is not stored. This final minor cycle is called the *storage* cycle. The operand digits are stored serially on magnetic storage drum 120 as the arithmetic processing produces each digit.

A major cycle of computation is initiated by a machine command. This command is located in the digit period preceding the first initiate minor cycle command. Usually only one major cycle is initiated per drum revolution. The major cycle command synchronizes the starting of the computer with the program so that the computation begins with the proper minor cycle. This command does not initiate any machine operations as defined by the Basic Algorithm but is used mainly to identify the beginning of a program. The major cycle command and its machine code representation is illustrated in FIGURE 10 and will be referred to later.

For purposes of visualizing a specific embodiment and how the system of FIGURE 8 may be employed so that more than one operation can occur during any given minor cycle, assume that a major cycle is equal to one revolution of drum 120 and that there are N minor cycles per major cycle. At any instant of time, i.e., in any minor cycle, say cycle $N-10$, while the incremental operands are being obtained in preparation for computation during the following minor cycle $N-9$, actual computing on a different problem may be occurring relative to a different set of incremental operands obtained during a prior minor cycle such as cycle $N-11$. Also, during cycle $N-10$, input-output operations can be accomplished. That is, for example, $V_1$ may be read out during cycle $N-10$ to data converter 127 (FIGURE 1) wherein it is compared to an analog input to cause a new analog output therefrom and an incremental output to storage unit 124.

Each of the different analog inputs and analog outputs may be associated with a different phase of an overall problem. For example, in a chemical processing problem, one analog input may be related to one measured input quantity while an analog output may control a valve regulating the rate of flow or amount of a different quantity. Other analog inputs and/or outputs may be similarly related to other quantities such as temperature, pressures, output rate, etc. Continuously controlling such variables under varying conditions may call for incremental solutions to several different types of mathematical relationships, such as those set forth above under "Machine Operations." Therefore, $V_i$ in one minor cycle may be associated with one such variable, and in the next minor cycle another $V_i$ may be associated with another such variable, etc., for the number of such variables involved in the overall problem.

The separate preparation, computing, and input-output operations when occurring during a minor cycle, although overlapping are not necessarily coextensive timewise, and any may extend into an adjacent minor cycle as may be noted in the later reference to FIGURE 9 in which a minor cycle is defined more particularly. The average time it takes to compute with already obtained operands and simultaneously obtain another set of incremental operands and have an input-output operation, may be thought of as an "average" minor cycle time. Such simultaneous operations may in effect be termed "one machine operation," and can be completed in one average minor cycle with optimum programming. However, it is to be understood that any one machine operation need not be completed in one average minor cycle, but instead may be spread out over several such cycles as desired. Further, the preparation and computing operations need not be time shared with each other or with input-output operations.

Referring now to the sample program set out in FIGURE 9, the digit periods refer to the time for the initiation or execution of machine commands in a given minor cycle. For example, 00 indicates the 1st digit period, 01 the second, etc. Each of the 4 columns under the single heading "machine commands" represents a minor cycle of computation. Each of the illustrated minor cycles consists of 19 digit periods. The program performed during cycles $X-1$, X, and $X+1$ is one for scaled incremental multiplication using an input variable as the multiplicand. The incremental multiplication is actually performed in minor cycle X (computation cycle). In the other cycles other machine operations can be performed while at the same time some of the machine circuits are concerned with the multiplication algorithm. Each minor cycle is initiated by a machine command designated "initiate minor cycle" which always occurs in digit period 00.

In digit period 09 of minor cycle $X-2$, the machine command "initiate comparison" is executed. This command causes data converter 127 of FIGURE 1 to compare the analog input thereto (in a modulator or comparator circuit as later described in connection with FIGURE 11) with a number ($V_i$) from the arithmetic section 126. Digit period 09 is chosen because the significance of V is usually ten binary digits. Assuming a 10 digit number, the digital number $V_i$ is fully generated by the computer via incremental adder 223 (FIGURE 8) in minor cycle ($X-2$) by the tenth digit period. Actually this initiate comparison could be located anywhere in the major cycle as the input increment is available in the magnetic core storage unit 124 of FIGURE 1. This operation is independent of the multiply algorithm. The modulator (data converter comparator) designator Mod. Address $M_1$ is in the digit period following the initiate comparison. The only arithmetic function of minor cycle $X-2$ may be to add $\Delta V_i$ to $V_{i-1}$, or it may include additional arithmetic functions when convenient.

A fixed time (in this illustrative program, eleven digit periods) after "initiate comparison," the results of the comparison are sampled; for example, in cycle $X-1$ the command "end pulse" causes the result of the comparison to be sampled and the incremental results thereof to be stored at digit address $Y_1$ (a storage address) in the magnetic core storage unit 124 of FIGURE 1. The storage operation is a predetermined period of time (3 digit periods in this program) after the command "end pulse." This time delay is determined by hardware considerations. Therefore, digit address $Y_1$ is read from drum storage during digit period 04 of minor cycle $X-1$ to cause the incremental results of the comparison to be stored. This input increment is programmed as $\Delta V$ in our multiplication operation. If an initiate comparison is programmed in a minor cycle containing 18 digit periods, the output increment therefrom is to be stored in digit period 05 of the next minor cycle. It so happens in our embodiment that the output increment from an arithmetic operation is stored in digit period 05 of minor cycles. In normal machine computation this situation is to be avoided by programming or erroneous results may occur.

The results of the "Initiate Comparison" in cycle X are not stored in storage 124 as no storage address is programmed in digit period 04 of cycle $X+1$. This "initiate comparison" may cause a calibration function to be performed in data converter 127, the results of which are not wanted in the storage unit.

In a case wherein an increment is to be stored during a predesignated digit period, the address acts as a quasi-machine-command. That is, the presence of a digit address code tells the machine to store the increment while the absence of a digit address code tells the machine to ignore the increment. Note that the results of minor cycles $X-3$, $X-2$ and $X-1$ are not stored, that is, no digit address is programmed in digit period 05 of cycles $X-2$, $X-1$ and X. The incremental result of cycle X is stored at digit address $Y_4$.

In cycle $X-1$ (preparation cycle), all incremental values to be used in multiplication are read from storage unit 124 of FIGURE 1. These storage references effect the programming of the machine operation. Take for example the machine command "Read to $\Delta V$." With reference to FIGURE 8 it will be recalled that increment $\Delta V_i$ is an input to incremental adder 223 and further in reference to FIGURE 5 that two electrical inputs ("Read $\Delta V$" and "$\Delta V$") are required for this incremental input. A Read $\Delta V$ input to "OR" circuit 200 is temporarily stored in bit register 107 as previously described. The command "Read to $\Delta V$" always inserts a "1" (sets the core 201) into this bit register. This "1" designates that an increment $\Delta V$ occurs (has been read from storage) in the next minor cycle (which is minor cycle X). The $\Delta V$ input to "OR" circuit 205 is temporarily stored in bit register 108 as previously described. This increment is read from storage unit 124 at address $Y_1$ and is routed over line 311' (FIGURE 11) via "AND" circuit 382 to this register by the command "Read to $\Delta V$." This command is executed in our sample program during digit period 06 of cycle $X-1$. Similarly the command "Read to $\Delta Q$" causes the same $\Delta V$ increment to be stored in a similar register (see FIGURE 6) associated with complementer 227 of FIGURE 8. The incremental information of address $Y_1$ is retained until a new address is programmed. Thus the restriction of operands, $\Delta Q_1 = \Delta V_1$, as expressed previously by Equation 14 is accomplished by executing the two storage references for these increments from the same storage address. Similarly, $\Delta T_1 = \Delta U_1$ by use of the same incremental information of address $Y_2$ for both the complementer 222 and incremental adder 224, while the information of address $Y_3$ produces $\Delta P_1$, and address $Y_4$ produces $\Delta W_1$ for complementers 225 and 226, respectively. Because of the lag of arithmetic operations to the "initiate minor cycle" these storage references should be programmed within a certain range of digit periods. The available time for a "Read to $\Delta U$" command in one embodiment spans all the digit periods from the time the bit register is cleared (digit period 03, $\phi 0$ of cycle $X-1$) until the transfer of this information into the arithmetic devices (digit period 02, $\phi 3$ of cycle X). This criterion is determined solely from circuit timing considerations. Similar criteria apply to the other incremental values. At the end of cycle $X-1$ in our sample program all required increments have been stored in appropriate bit registers of the arithmetic section.

An additional method of restricting incremental operands is not to program them. Where it is desired that incremental operand be 0 or ±1, two signals are employed, as described above relative to FIGURE 5, e.g., the "Read ΔV" and ΔV signals. Each of these signals is either a pulse or no pulse and the combination determines the effective incremental operand (ΔV in this case) value as previously indicated. When the "Read ΔV" signal is not programmed (no impulse therefor), the effective ΔV value is zero, i.e., no increment is effectively programmed regardless of whether the ΔV signal itself is a pulse or no pulse, incremental operand ΔV being thereby restricted to zero. Under such circumstances, it is, of course, unnecessary to program and extract from digit storage a pulse or no pulse for the ΔV signal itself. Where the effective incremental operand should never be zero, e.g., ΔQ, no "Read" signal is employed therewith but that signal is effectively replaced by recurrent timing pulses as previously described relative to FIGURE 6. Then, the effective value of the incremental operand is ±1 according to whether the Δ signal therefor is a pulse or no pulse since lack of an impulse is defined as a −1 as previously indicated; therefore, if no pulse is programmed for the ΔP signal, for example, this is the same as if the incremental operand ΔP were not programmed but nevertheless the effective value of that incremental operand is then −1. In the incremental adders 223 and 224 of FIGURE 8, ΔV$_i$ and ΔU$_i$ can be made zero by not programming the respective "Read" signals. Thus $U_i = U_{i-1}$ and $V_i = V_{i-1}$. In one embodiment increments ΔP$_i$ and ΔT$_i$ may be made zero. Thus complementers 222, 225 of FIGURE 8 are of the type illustrated in FIGURE 6. The remaining incremental values ΔQ$_i$, and ΔW$_i$ are never equal to zero. The effect of not programming these latter increments would make them a constant minus one. Thus, they are programmed to be effectively either ±1, but since they need not be zero, complementers 226 and 227 have circuits of FIGURE 6 less register 169.

When computation cycle X is initiated, the computer performs the scaled incremental multiplication because the appropriate increments have been programmed and stored in the arithmetic section. The function of scaled multiplication has been previously described under Machine Operations. The incremental result, i.e., increment ΔW, of this incremental multiplication cycle is always stored on digit period 05 of cycle X+1 in the increment storage 124 at address Y$_4$. This increment is a function of the sign digit or MSD of the error function or remainder R$_i$ computed in cycle X as expressed in Equation 18. That is, the incremental output of each incremental computation cycle for the apparatus of FIGURE 8 is related to the sign digit of the remainder R$_i$. When R$_i$ is positive, no pulse is gated to line 257 in FIGURE 8, but when negative a pulse occurs. By NOT circuitry later described in relation to FIGURE 11B (see core 323), the lack of a pulse gets converted into a pulse which is stored as a binary 1 in the storage unit 124 (FIGURE 1). Any pulse which occurs on line 257 because R$_i$ is negative, also gets converted and becomes a no pulse signal or binary 0 which is stored in unit 124. Since ΔW, the only dependent variable increment during an incremental multiplication operation, for the corresponding computation cycle in the next major cycle ($i$+1) is programmed as the incremental output of the corresponding computation cycle of the preceding major cycle ($i$), and since the lack of an increment pulse (binary 0) is defined as a −1, ΔW$_{i+1}$ is the stored binary digit 1 or 0 and effectively represents a +1 or −1 increment, respectively, in accordance with whether R$_i$ was positive or negative, as indicated by Equation 18.

In one embodiment the complement of the sign of R$_i$ is stored, that is, when R$_i$ is positive a "1" is stored and when R$_i$ is negative a "0" is stored. In machine operations wherein the increment is programmed to be negative where R$_{i-1}$ is positive, the machine command caus- ing the storage reference changes the sign of the increment prior to insertion in the bit register as later explained in reference to FIGURE 11. This increment is stored in the same address in which ΔW was procured for complementer 226; therefore, the result of this computation will become ΔW of cycle X in the $i$+1 major cycle as determined in Equation 18.

FIGURE 10 illustrates a sample instruction code structure which can be used to implement the program of FIGURE 9. The digit positions $2^0$ through $2^6$ correspond to the respective tracks on drum 120 in FIGURE 11. A storage address Y or modulator address M is indicated in the $2^0$ through $2^5$ digit positions in FIGURE 10 by a lack of an impulse or "0" in the $2^6$ digit position. The electrical impulses in the remaining digit positions are then interpreted either as the coded binary six digit storage address or as a four bit modulator address. Address Y consists of the six bits $y_0$-$y_5$. When there is a "1" or pulse equivalent in the $2^6$ position, the remaining digits are interpreted as a machine command or commands. These machine commands can be divided into two main functional groups. The first group of commands initiate machine operations illustrative of which are commands "Initiate Comparison," "End Pulse" and "Initiate Minor Cycle" the binary codes for which are designated by digit positions $2^4$ and $2^5$. The second group of commands initiate storage references to storage unit 124 of FIGURE 1 and are designated by bits $2^0$ through $2^3$ in FIGURE 10. By placing a "1" in the $2^3$ digit position for this second group the negative of the increment is read. The exception in this second group is the command "Initiate Major Cycle" which has been described. All 0's in either group designate a "no action" or "do nothing" command. These zeros are used to fill in blank spaces in the command tracks as shown by the dash marks in FIGURE 9. In FIGURE 10 the horizontal dash marks in the digit columns indicate that particular digit position is not used in designating that machine command. Therefore, if it is convenient, commands from groups 1 and 2 may be encoded in the same word on the storage drum.

Figure 12:
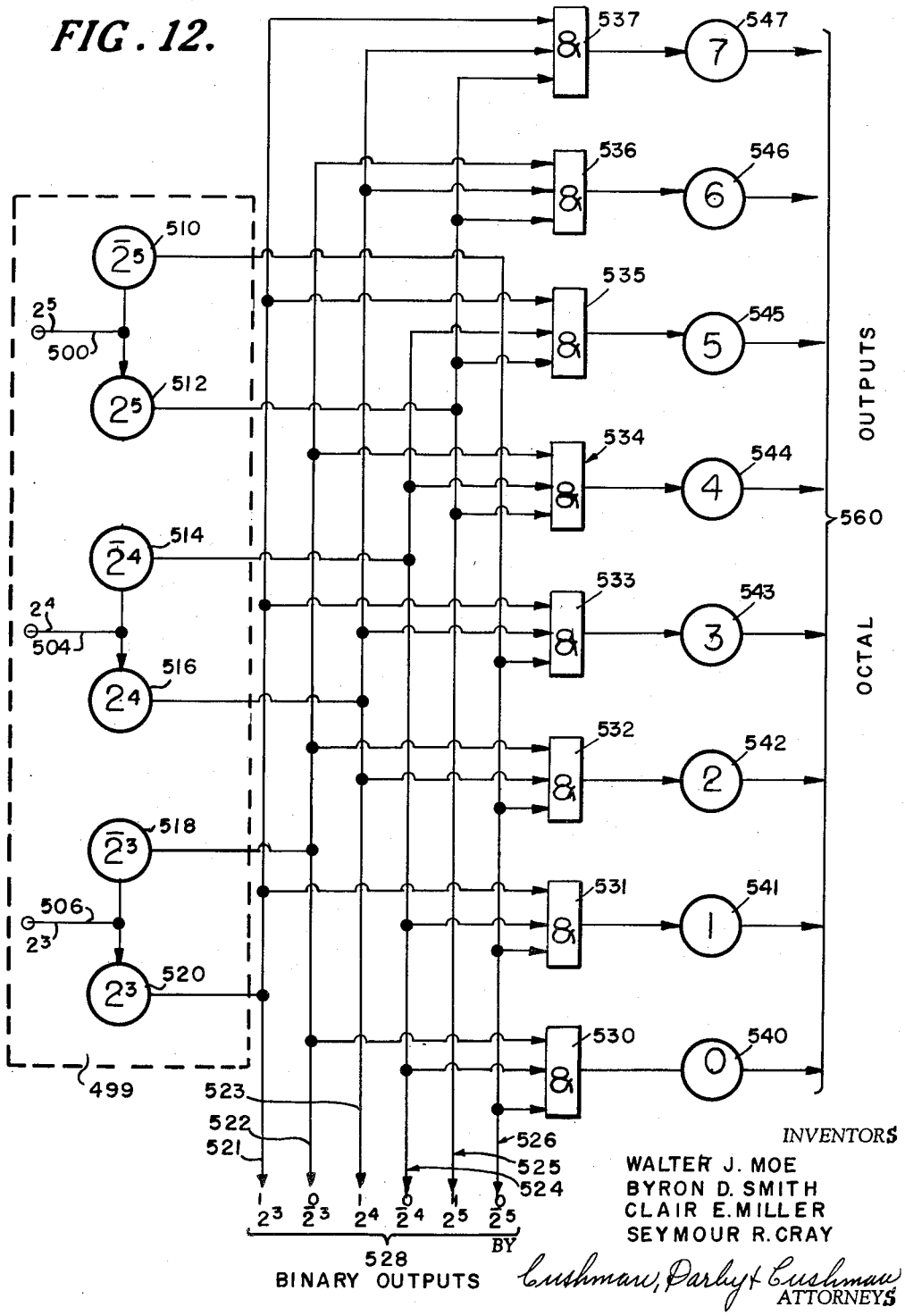
FIGURE 12 is a shorthand schematic illustrating an electronic translator.

Referring now to FIGURE 12, the apparatus in dash lined circuitry 499 is an illustrative portion of the partial translator 360 of FIGURE 11. Since translator 360 has seven binary inputs, seven circuits identical to the circuit including switch cores 518 and 520 and input 506 constitute translator 360. In FIGURE 12 trunk line 528 carries the $2^3$ through $2^5$ digit position binary outputs of circuit 499 and corresponds to trunk line 118 of FIGURE 11. Translator 122A of FIGURE 11B includes the "AND" circuits 530 through 537 and cores 540 through 547, while translator 122B is similar to translator 122A and responds to the binary outputs in trunk line 121 which result from pulses or lack of pulses in the $2^0$ through $2^2$ digit positions. In addition $2^0$ to $2^5$ outputs, partial translator 360 of FIGURE 11B contains the above indicated 7th input circuit for partial translation of the $2^6$ digit position impulses in the same manner as described for the $2^3$ to $2^5$ outputs in the next paragraph. The address translator 122 of FIGURE 1 comprises partial translator 360 and translators 122A and 122B. Some of the control impulses from the drum are applied directly to other circuits as is later explained in addition to the partial translator 360.

Referring again to FIGURE 12, input lines 500, 504 and 506, respectively, receive the impulses from the $2^5$, $2^4$ and $2^3$ tracks on the magnetic storage drum. Each electrical input impulse to a given input line represents a binary "1" and sets one core and clears one core. Lack of an electrical input impulse to a given input line represents a binary "0," and allows the respective core 510, 514, or 518 to remain set after being automatically set in the clock phase preceding the transfer of binary data from the magnetic drum. Thus after the first partial translation an impulse represents either a "0" or a "1"

depending on which output line it is present. For example, impulses on even numbered output lines 522, 524, and 526 represent 0's, while impulses on the odd numbered output lines represent 1's. Thus an impulse on line 521 indicates a "1" in the $2^3$ digit position and an impulse on line 524 indicates a "0" in the $2^4$ digit position. These impulses are distributed throughout the computer as illustrated in FIGURE 11 by line 362 which represents all outputs from translator 360.

The translation from binary notation to another notation is accomplished by "AND" circuits 530 through 537 and cores 540 through 547 in FIGURE 12. In the illustration the translation is from binary to octal notation. The numerals within the symbols for cores 540 to 547 indicate the octal notation represented by an output impulse therefrom. For example, the "4" in core 544 represents a "4" in octal notation. The input "AND" circuit to these cores perform the translation of each octal digit. For example, "AND" circuit 530 has lines 522, 524, and 526 as inputs. Impulses on all of these lines indicate a "0" in each binary digit position and a "0" in octal notation is produced. Similarly, the other octal digit positions are translated following the well known numerical relationships of binary and octal notation. One and only one "AND" circuit is satisfied by any one set of binary values.

Another method of translation is to cause all cores 540 through 547 to be unconditionally set just preceding translation and then the output of one "AND" circuit would clear one core. Thus the lack of an electrical impulse will represent the discrete octal value.

Other translators in the computer receive the signals from partial translator 360 and operate similarly to translators 122A and 122B of FIGURE 11B. Translator 334 in Data Converter 127 shown in FIGURE 11 is a binary to hexadecimal translator, the only difference between translator 334 and translator 122A (or 122B) being that translator 334 has 16 circuits each including an "AND" and core circuit (like "AND" and core circuits 530, 540 in translator 122A in FIGURE 12) instead of eight as in translator 122A (or 122B) and each "AND" circuit has four binary inputs rather than three. This translator translates digits $2^2$ through $2^6$ to select one of sixteen comparators 333. The decoding or translating of machine commands is accomplished in a similar manner.

The data converter 127 is controlled solely by the computer program of machine commands. The proper digits of the partially translated command code are inserted in the controller and translator 334 via transmission trunk 363. The trunk includes lines carrying information from magnetic drum tracks $2^2$ through $2^6$ inclusive. Digit positions $2^4$–$2^6$ may designate commands such as "Initiate Comparison" and "End Pulse," as shown in FIGURE 10, while positions $2^2$–$2^6$ may designate comparator selection only in the digit period immediately following command "Initiate Comparison." The selection code also will cause one of "AND" circuits 350, 351, or 352 to pass the output of detector 336 to the respective holding circuit 335, 337, or 338 when the corresponding comparator is selected. The comparator 333 in one embodiment include 15 analog comparing magnetic modulators and one zero reference modulator. The analog comparing modulators operate to compare the analog output of the digital to analog converter 332 with the different analog inputs 346 by aid of detector 336 and its output return via line 240 in the manner described and claimed in the copending application of Robert W. Schumann, filed May 15, 1956 Serial No. 585,009, now Patent No. 2,828,482. The operation of the zero reference modulator and holding circuits 335, 337, and 338 is fully described and claimed in another copending application of Robert W. Schumann filed May 15, 1956 Serial No. 585,008, now Patent No. 2,861,244. If the zero reference modulator is selected, "AND" circuit 350 is probed in time coincidence with the output of detector 336. (The contents of the shift register 331 must be the machine representation of zero when a zero calibration is initiated.) This adjusts holding circuit 335 as described in said Serial No. 585,008 causing detector 336 to be zero calibrated. Similarly, holding circuits 337 and 338 are adjusted providing properly modified analog output signals. The output of the detector is applied to "AND" circuits 350, 351, 352 and 356 as shown. If the output of the detector is to be inserted into the magnetic core storage unit 124, "AND" circuit 356 must be satisfied.

The command "End Pulse" on trunk line 363 initiates the sampling of detector 336 by derivation in translator 334 of an impulse on line 349 to enable detector 336. A shift register of the type described in FIGURE 4 is included in translator 334 to delay the translated command until the detector is ready to be sampled. The output of detector 336 may be, for example, applied to "AND" circuit 356 during the third digit period after the "End Pulse" in $\phi 1$ of a given digit period. If an address is programmed, an impulse from partial translator 360 representing $\overline{2}^6$ is applied to "AND" circuit 356 over line 365 in time coincidence with the detector output. The output of "AND" circuit 356 is applied to "OR" circuit 321 in the magnetic core storage unit. The presence of an impulse means a storage address has been programmed and the detector output represents a plus one increment. The absence of an impulse means that either the detector output represents a minus one increment or an address was not programmed. The apparent ambiguity in the latter representation is of no consequence as the magnetic core storage unit 124 will interpret the meaning in its proper sense.

The selection of the comparators 333 is accomplished, for example, by any one of the excitation switching systems described and claimed in another copending application of Robert W. Schumann filed May 15, 1956 Serial No. 585,104, now Patent No. 2,682,190. The excitation control system may be included in the controller and translator 334 and applied to the comparators by excitation bus and grid control lines in trunk line 339 through the excitation switches 340.

Analog current values on lines 346 form either an independent or dependent input to the computer. These values are compared with an analog of the internally generated number $V_i$ in comparator circuits 333 in the manner described in said Serial No. 585,009. The output from these comparators is detected by detector 336. If the internally generated number $V_i$ is greater than or equal to the value of the analog input on one of lines 346, the internal number is deemed correct. Then the detector provides no pulse output. The lack of an output impulse is interpreted by the computer as a minus one increment. If the internal number $V_i$ is less than the analog input, the internal number is deemed incorrect by the detector and a pulse output is provided; this is interpreted as a plus one increment.

The output of the detector 336 participates in all comparisons performed by the comparators. When the detector output represents an independent input, the information passes through "AND" circuit 356 to the magnetic core storage unit 124. This output which is a single electrical impulse or lack of impulse representing the relationship of the internal number $V_i$ to the analog input forms what has been previously termed an "incremental input." This information is programmed into the arithmetic operations to modify the internal number to bring it closer to the analog value. In this manner the computer forms a number generator and a control therefor as in said Serial No. 585,009. Thus this analog-to-digital converter becomes an operational part of our first embodiment.

This same input increment participates in arithmetic functions as the scaled incremental multiplication to complete programmed arithmetic functions. The results of these arithmetic functions may form incremental outputs of the computer. All outputs of one embodiment are formed as a number designated $V_i$ by the arithmetic unit. This number like any internally generated number designated as $V_i$ is shifted through shift register 331 from the arithmetic unit 126. $V_i$ can represent an input quantity, an output quantity, a constant or in intermediate value depending on the machine program.

Shift register 331 can be similar to the one illustrated in FIGURE 4 but here each adjacent core is sensed two clock phases apart. For example, $\phi 1$ and $\phi 3$ can be used to shift the data. Two cores are required to shift and store one bit. The least significant digit of $V_i$ is shifted into 331 during $\phi 1$ of digit period 02 of each minor cycle. If the operand $V_i$ has ten significant digits the word $V_i$ will be in shift register 331 during digit period 11 after $\phi 1$. Since shift register 331 never stops shifting, the data transferred during $\phi 3$ of digit period 11 must be captured by digital-to-analog converter 332 when a conversion is to take place. In one embodiment an "initiate comparison" is programmed during digit period 09 (see X—2 minor cycle of the sample program in FIGURE 9) to cause the data in shift register 331 to be transferred to converter 332 on $\phi 3$ of digit period 11. The "initiate" comparison is translated in translator 334 as described in connection with FIGURE 12, the translated command is inserted in a shift register of the type described in FIGURE 4, and the last output thereof transfers the data from 331 to 332 by pulsing "AND" circuits 331A. There is one "AND" circuit per digit position of the shift register. The digital-to-analog converter 332 may be similar to the one described and claimed in said Patent No. 2,828,482.

The computer outputs are analog voltages provided by holding circuit outputs 347 and 348. The holding circuits may be similar to the one described and claimed in said copending application Serial No. 585,008. The output voltages are selectively varied by the output of the detector 336. The device connected to each of such holding circuits is caused to change incrementally according to the changes in the holding circuits until its current output is the equivalent of the computed result $V_i$. Then the output oscillates about the optimum result. Thus a computed result $V_i$ is compared with a voltage produced by a control device connected to one of lines 346, and if they are not the same, holding circuit 337 or 338 causes an incremental change to be effected by this control device. This in turn produces a corresponding incremental change in the analog output of the control device. The control device is required to change incrementally until its voltage output corresponds to the computed result $V_i$.

One machine command provides means of obtaining inputs to and providing outputs from the computer. Certain magnetic comparators are arbitrarily designated as input comparators and the others are output comparators. By merely programming or omitting "initiate comparisons" any variable $V_i$ may be designated as an input, output, or an intermediate variable. Thus the computer can also easily operate as a regular digital differential analyzer solving various problems by merely modifying the coded program of machine commands.

Continuing to refer to FIGURE 11, but now to the storage unit 124, the main portion thereof is the incremental digit storage or memory 125 which may be a two-dimensional array of magnetic cores similar to the type described by J. W. Forrester, Journal of Applied Physics, vol. 22, No. 1, January, 1951, pages 44 ff. with associated circuitry. The memory is an 8 x 8 array of magnetic cores and thus uses the binary-to-octal translators 122B and 122A of the type described in FIGURE 12. Only the $2^0$ to $2^5$ digit positions are translated. Each binary coding is interpreted as a digit (storage) address and the information contained in the selected memory core is applied to "AND" circuit 320. The information contained in digit position $2^6$ determines the use of the output from digit storage 125. If the $2^6$ digit position contains a "0" the information in the digit positions $2^0$ through $2^5$ represent a true storage address, while if the $2^6$ digit position contains a "1" the coding represents a machine command and the contents of the selected core is not used.

Since the digit storage 125 always interprets the contents of the $2^0$ to the $2^5$ digit positions as a storage address, an output (presence or absence of an impulse) occurs each digit period. The information from the selected memory core is destroyed by reading the core and must be rewritten into that core to retain the information in storage 125 at the same address. Thus when the coding does not actually represent a storage address the information must always be restored to the selected memory core. When the coding actually represents a storage address and the operation is one of obtaining information from the storage, this information must also be retained in storage 125. Only when the coding represents a storage address and the operation is to insert information, is the old information from the selected core discarded.

These criteria are determined by core 316 and associated circuits in the following manner. Core 316 is unconditionally set each digit period. Transmission lines 374 and 375 transfer the translated information $\overline{2}^6$ to "AND" circuits 373 and 368, respectively. This information is combined in these "AND" circuits with information from data converter 127 on line 366 and arithmetic unit 126 on line 319. If either the arithmetic unit 126 or data converter 127 have information to be stored and a storage address is programmed, core 316 is cleared, thereby preventing an output from core 316, disabling "AND" circuit 320, and suppressing any impulse from the selected memory core in digit storage 125 by "AND" circuit 320. In all other digit periods core 316 remains set, the output of which coincides in time with the output of digit storage 125 and is combined therewith in "AND" circuit 320. An impulse from circuit 320 represents that a "1" was stored in the selected memory core and no new information is to be inserted. This impulse passes through "OR" circuit 321, back to digit storage 125, and to "AND" circuit 326. In an actual circuit a switch core should be placed at point 325 to provide signal amplification. "AND" circuit 326 determines when an impulse is to be inserted in the bit register which includes "OR" circuit 329, cores 330, 310 and recirculating line 311.

The other two inputs to "OR" circuit 321 are outputs from arithmetic unit 126 and data converter 127. "AND" circuit 356 "gates" the output of detector 336 with the impulse representing $\overline{2}^6$ on line 365. Transmission line 358 transfers the detector output increment to "OR" circuit 321. The third input to "OR" circuit 321 is from core 323, the content of which represents the negative of the sign of $R_i$. Core 323 is conditionally set by the output of "AND" circuit 370. An impulse on line 318 represents that arithmetic unit 126 is in digit period 05 of a minor cycle (the sign of $R_i$ is available for storage). An impulse on line 372 represents the partial translator output of $\overline{2}^6$ (a storage address is programmed since digit position $2^6=0$). The output impulse on line 322 represents that a computed increment is to be stored. The "clearing" input line 324 to core 323 is the same line as line 257 of FIGURE 8, and carries the gated sign signal of $R_i$. If $R_i$ is positive no impulse will be emitted to line 324 and core 323 will remain set to provide an output. If $R_i$ is negative an impulse on line 324 will clear core 323 and prevent an output. An output impulse from core 323 represents a plus one increment and occurs only when $R_i$ is positive.

"AND" circuit 326 "gates" the output of "OR" circuit 321 to the bit register at "OR" circuit 329. An impulse on lines 328 and 328A represents $\overline{2}^6$ is a 0. Thus when a storage address is programmed, core 310 is cleared prior to readout thereby erasing the information content of the bit register. When core 310 is sensed no information is available, which is permissible since no reference to stored data is made in a digit period wherein an address is programmed. The output of "AND" circuit 326 inserts the new information into this bit register. This new information recirculates in the bit register until one of two functions occur: one, if a new magnetic core memory address is read from the drum, the information located at that new memory address is inserted in the bit register; two, when the results of an incremental computation or a data converter comparison are stored, that information is inserted in the bit register.

The bit register recirculates a stream of impulses when a +1 increment is stored therein. On $\phi 2$ these impulses are transmitted over line 311′ to "Exclusive OR" circuit 380. This circuit provides a selective sign change of increments and may be similar to circuit 105 in FIGURE 5 or the "Exclusive OR" circuit 171 of FIGURE 6. The incremental values are inserted on line 161 of FIGURE 6, while the impulse representing the $2^3$ digit position is inserted on line 162. In FIGURE 11 lines 311′ and 314, respectively, correspond to these input lines. Referring again to FIGURE 6, an impulse appears every digit period on line 167 to unconditionally set core 166. Thus the circuit operates as an "Exclusive OR" circuit each digit period. If an impulse ("1") is received from the $2^3$ digit position on line 314, the increment on line 311′ is complemented (sign is reversed). If no impulse is received on line 314 then the increment is passed unchanged. Since this is merely a change of sign for an increment no carry is required. In the illustrated program no increments were modified by this circuit.

The output of circuit 380 is applied to six "AND" circuits, one for each possible incremental value $\Delta U$, $\Delta V$, $\Delta W$, $\Delta Q$, $\Delta T$ and $\Delta P$. Two of these "AND" circuits 382 and 384 only are illustrated in FIGURE 11 for convenience, the remainder being understood to operate in the same manner. Connectors 381 and 383 include the input lines from the partial translator 360 representing a machine command designating a storage reference. For example, the command "Read to $\Delta P$" may be identified by a "1" in the $2^0$ and $2^6$ digit positions and a "0" in the $2^1$ and $2^2$ digit positions. (See FIGURE 10 for sample coding.) Connector 381 consists of 4 electrical lines, one for each of the above items of command information. The output of "AND" circuit 382 is, for example, "Read $\Delta P$" which is inserted in the proper bit register in the arithmetic unit. The command information transferred over connector 381 is also combined in another "AND" circuit (not shown) to form the command information "Read $\Delta V$," for example, which is likewise inserted in a bit register in the arithmetic unit. "AND" circuit 384 similarly translates a binary encoded command and passes incremental information to the arithmetic unit 126.

"AND" circuit 345 translates the command "Initiate Minor Cycle" as received by impulses on lines 341, 342, 343, and 344 directly from the magnetic storage drum. An impulse on each line represents a "1" in the $2^0$, $2^1$, $2^2$, and $2^6$ digit position, respectively. These impulses are direct from the storage drum because the function is required in $\phi 0$ of digit period 00. The output of "AND" circuit 345 sets core 376 and may be timing pulse $$TP_{00}^{0}$$

as in FIGURE 4, or pulse $$TP_{00}^{0}$$

may be generated by another "AND" circuit (not shown) to perform its function as previously described. The other commands are translated and implemented in a similar manner as the examples, however the electrical information is from the partial translator 360 rather than directly from the storage drum 120.

In FIGURE 11 arithmetic unit 126 includes circuits as described for FIGURE 8 plus the timing circuits of FIGURE 4. The stream of electrical impulses representing the error function $R_{i-1}$ are transferred from the magnetic drum storage on transmission line 355 through "AND" circuit 317 to the arithmetic unit 126. "AND" circuit 317 corresponds to switch 234 of FIGURE 8. Flip-flop 301 disables "AND" circuit 317 on the first major cycle of computation to make $R_0=0$. During all other major cycles "AND" circuit 317 passes $R_{i-1}$. Line 241 transfers the error function $R_i$ from arithmetic unit 126 to the magnetic drum for temporary storage, while line 324 transfers the sign of $R_i$ to core 323 in the storage unit 124.

Transmission line 357 transfers scale factor S from the magnetic drum storage 120 to the arithmetic unit 126.

The circuits for recirculating the variable V are shown as numerals 304 through 309. The output $V_i$ from arithmetic unit 126 is transferred serially via transmission line 240 to shift register 331 and to the V track of magnetic drum 120 via line 240′. During the next major cycle of computation, and in the corresponding minor cycle, $V_i$ is read off the drum as $V_{i-1}$ on line 354. Each machine operation has its own separate set of variables. The increments effect the cross-telling of information between various machine operations. Flip-flop 301 provides the switching action for selecting initial values for beginning new incremental computations. An externally generated stimulus, such as may be provided by a human operator pressing a pushbutton, sets flip-flop 301 to the 0 state. This initiates a new incremental computation. The state of the flip-flop is transferred to "AND" circuits 305 and 307 over lines 304 and 306, respectively. It is to be understood that the U and $U_o$ tracks are similarly connected to "AND" circuits enabled in the same manner by flip-flop 301 for transmission to arithmetic unit 126. In the case of variable V, the initial value $V_o$ is continuously being read from track $V_o$, but only when "AND" circuit 305 is enabled do the initial digit values of V pass through "OR" circuit 309 to arithmetic unit 126. Upon completion of the first major cycle of computation, flip-flop 301 is reset to the 1 state and remains in this state until another computation is initiated. The 1 state disables "AND" circuit 305 and enables "AND" circuit 307 allowing only the computed variables to be used. This action is also described by switches 232 and 233 of FIGURE 8.

Thus it is apparent that there is provided by this invention systems in which the various phases, objects and advantages herein set forth are successfully achieved.

Modifications of this invention not described herein will become apparent to those skilled in the art. Therefore, it is intended that the matter contained in the foregoing description and the accompanying drawings be interpreted as illustrative and not limitative, the scope of the invention being defined in the appended claims.

What is claimed is:

1. In a digital computer, arithmetic apparatus operable in accordance with the general integral form $$W = P + 1/S \int U dQ + 1/S \int V dT$$

wherein S is a scale factor, V is a first quantity, U is a second quantity and W, P, Q and T are operands, to perform any of a plurality of various incremental mathematical operations comprising means for supplying groups of digital signals representing V, U, and S respectively at the beginning of a given computation cycle, means for supplying digital signals representing at least increments $\Delta U$, $\Delta T$, $\Delta Q$, $\Delta P$, and $\Delta W$ to be employed in said cycle, an output line, and means for substantially simultaneously combining all of said signals in said cycle in a given manner and with a group of digital signals all previously present on said output line and representing a composite remainder signal R from a prior computation cycle to form on said output line during said given computation cycle a new group of digital signals representing a new composite remainder signal $R_1$ equal in mathematical representation to $$R+(U+\Delta U)\Delta Q+V\Delta T+S\Delta P-S\Delta W$$

2. Apparatus as in claim 1, wherein the combining means includes incremental adder means for effectively summing during said given cycle the U and $\Delta U$ signals, means for effectively multiplying the $(U+\Delta U)$ and $\Delta Q$ signals, means for effectively multiplying the V and $\Delta T$ signals, means for effectively multiplying the S and $\Delta P$ signals, means for effectively multiplying the S and $\Delta W$ signals, and means for effectively adding the resultant sums and products to form the $R_1$ remainder signal.

3. Apparatus as in claim 2 wherein each of the multiplying means includes a complementer.

4. Apparatus as in claim 2 wherein the last mentioned adding means includes a plurality of adders.

5. Apparatus as in claim 1 wherein the increment signal supplying means includes means for supplying a signal representing the increment $\Delta V$, and the combining means includes incremental adder means for effectively summing during said given cycle the V and $\Delta V$ signals to form $V_1$ signals.

6. Apparatus as in claim 5 wherein the increment signal supplying means supplies for each of said increments a signal which is representative of a single digit binary number.

7. Apparatus as in claim 5 and further including means for determining each of the increment signals so that each is representative of one of a plurality of numerical values when supplied by the increment signal supplying means.

8. Apparatus as in claim 7 wherein the increment signal determining means includes programming means.

9. Apparatus as in claim 8 and further including means for causing the increment signal determining means to operate prior to said computation cycle.

10. Apparatus as in claim 5 wherein the combining means includes second incremental adder means for effectively summing during said given cycle the U and $\Delta U$ signals to form $U_1$ signals, said arithmetic apparatus including means coupled to the outputs of said adder means respectively for storing said $U_1$ and $V_1$ signals, means coupled to said output line for storing the $R_1$ signal, the means for supplying groups of digital signals operating in a cycle succeeding said given computation cycle to supply said $U_1$, $V_1$, and $R_1$ signals from their respective storage means along with the S signals, the increment signal supplying means operating after said given computation cycle to supply at least increment signals $\Delta U_1$, $\Delta T_1$, $\Delta Q_1$, $\Delta P_1$, and $\Delta W_1$, and said combining means operating in a second computation cycle to cause on said output line another composite remainder signal equal in mathematical representation to $$R_1+(U_1+\Delta U_1)\Delta Q_1+V_1\Delta T_1+S\Delta P_1-S\Delta W_1$$

11. Apparatus as in claim 10 wherein at least said means for storing the $R_1$ composite remainder signal includes storage means for successive composite remainder signals, each composite remainder signal being variable in length in accordance with the number of binary digit signals included therein as determined by the computation occurring during the corresponding computation cycle, and wherein each of the composite remainder signal storage means is effectively adjustable in length to accommodate storage of all and substantially only all of the binary signals for any possible computed composite remainder signal.

12. Apparatus as in claim 11 and further including program means for effectively adjusting the length of any given composite remainder signal storage means.

13. Apparatus as in claim 12 wherein the program means controls at least the $\Delta P$ and $\Delta W$ type increment signals as to their values for successive computation cycles and the combining means includes means for modifying said S signals thereby to accomplish automatic scaling of the composite remainder signals.

14. A digital incremental computer comprising means for storing and cyclically delivering groups of digital signals respectively representing in a general sense three numerical quantities V, U, and R and a constant scale factor S, means for determining the values of and supplying for each cycle digital signals representing variable increments $\Delta V$, $\Delta U$, $\Delta T$, $\Delta Q$, $\Delta P$, and $\Delta W$, means for substantially simultaneously combining in a given manner during each cycle all of the said signals for the respective cycle including: means for effectively adding the instant cycle V and $\Delta V$ signals to obtain resultant V signals $V_1$ for the next cycle, means for effectively adding the instant cycle U and $\Delta U$ signals to obtain resultant U signals $U_1$ for the next cycle, means for effectively multiplying the $U_1$ and instant cycle $\Delta Q$ signals to obtain $U_1 \Delta Q$ signals, means for effectively multiplying the instant cycle V and $\Delta T$ signals to obtain $V\Delta T$ signals, means for effectively multiplying the instant cycle S and $\Delta P$ signals to obtain $S\Delta P$ signals, means for effectively negatively multiplying the instant cycle S and $\Delta W$ signals to obtain $-S\Delta W$ signals, and means for effectively adding the instant cycle's R, $U_1\Delta Q$, $V\Delta T$, $S\Delta P$, and $-S\Delta W$ signals to obtain resultant R signals $R_1$ for the next cycle; and means for inserting the resultant signals $V_1$, $U_1$, and $R_1$ into said storing and delivering means in a non-precessing manner for delivery thereby of the said $V_1$, $U_1$, and $R_1$ signals in the next cycle respectively as that next cycle's instant V, U, and R signals.

15. A digital incremental computer as in claim 14 and further including means for receiving and converting the resultant V signals into a corresponding analog signal, means for comparing that analog signal with another analog signal relating to a function to be controlled, means for detecting a difference in the two analog signals and providing a difference signal, means for providing an output analog signal representing said another analog signal changed by said difference signal.

16. A digital incremental computer as in claim 15 wherein the means for determining the values of and supplying for each cycle digital signals representing increments includes a random access binary digit memory, means for causing storage in said memory of said difference signal, and means for causing the next $\Delta V$ signal to represent the so stored difference signal.

17. A digital incremental computer as in claim 14 wherein the storing and delivering means includes means for permanently storing digital signals representing initial values of V, U, and R and means for storing the resultant V, U, and R signals, and further including means for coupling the combining means initially to receive the initial V, U, and R signals and then to the resultant V, U, and R storing means, whereby the initially stored V, U, and R signals are non-volatile.

18. A digital incremental computer as in claim 17 wherein the means for determining the values of and supplying for said cycle digital signals representing variable increments includes non-volatile programming means.

19. A digital incremental computer as in claim 14 wherein the means for determining the values of and supplying for each cycle digital signals representing variable increments includes means for sensing the sign of the resultant R signals of each cycle and for causing the $\Delta W$ increment in each cycle to effectively represent a binary $\pm 1$ in accordance with whether the sign of the resultant R signal in the next prior cycle was positive or negative.

20. A digital incremental computer as in claim 14 wherein the means for determining the values of and supplying for each cycle digital signals representing variable increments includes means for making the $\Delta W$ signal in each cycle effectively represent $\pm 1$ in accordance with whether the sign of the resultant R signal in a prior cycle was positive or negative and for making the effective $\Delta P$ signal in each cycle represent $\pm 1$ or 0 in accordance with the type of incremental mathematical relationship being computed, the arrangement being such that for any cycle the value of the resultant scale factor $S\Delta P - S\Delta W$ is $2S$, $S$, $0$, $-S$, or $-2S$ in accordance with the effective values of $\Delta P$ and $\Delta W$ for that cycle.

21. A digital incremental computer as in claim 14 wherein the means for determining the values of and supplying for each cycle digital signals representing variable increments includes a random access binary digital memory and programming means for randomly accessing the binary digit signals in said memory and for causing any so accessed signal to represent at least one of the variable increment signals effectively as $\pm 1$ or $0$ in accordance with a predetermined program.

22. In a digital incremental computer, means including a register for supplying digital signals representing at least one quantity, a remainder register, means for adding or subtracting said quantity to the contents of the remainder register in accordance with a digital signal representing the sign of an increment, a third register for supplying signals representing a scale factor, means for producing a signal indicating the sign of a quantity in the remainder register, and means coupling the last mentioned means and the scale factor register to the remainder register for servoing the quantity in the remainder register toward zero whereby the scale factor is subtracted from the quantity in the remainder register when that quantity is a positive number and is added thereo when that quantity is a negative number.

23. In a digital incremental computer, means including at least a first register for supplying digital signals representing at least one incrementally variable quantity, a remainder register, means for adding or subtracting said quantity to the contents of the remainder register in accordance with a digital signal representing the sign of an increment, a third register for supplying signals representing a scale factor, and means for servoing the quantity in the remainder register towards zero including means for coupling the said scale factor signals to the remainder register in accordance with the sign of at least the quantity in the remainder register.

24. Apparatus as in claim 23 wherein the first mentioned register stores digital signals representing the number $U$, and the means including said first mentioned register supplies as said one incrementally variable quantity digital signals representing a number $U + \Delta U$.

25. A computer as in claim 23 wherein the first mentioned register supplies digital signals representing incrementally variable number $V$ and the means including said first register supplies a number $V + \Delta V$, said quantity which is added or subtracted to the contents of the remainder register as aforesaid being said number $V$.

26. In a digital incremental computer, means including at least a first register for supplying digital signals representing at least a first quantity, a remainder register for storing a second quantity, means for adding or subtracting said first quantity to or from said second quantity in said remainder register in accordance with a digital signal representing the sign of an increment of variable sign, a third register for supplying digital signals representing a third quantity, and means for operating on said second and third quantity signals for effecting algebraic subtraction of said second and third quantities.

27. In a digital incremental computer, means including at least a first register for supplying digitial signals representing at least a first quantity, means for operating on said signals in accordance with the instant effective value of a signal representing an increment of variable sign for effecting multiplication of said first quantity by said increment to cause digital signals representing a second register for supplying digital signals representing a third quantity, a third register for supplying digital signals representing a fourth quantity, and means operable on said variable, third, and fourth quantity signals for changing the magnitude of a said third quantity at least toward zero by effecting algebraic substraction of said third and fourth quantities and for effectively summing algebraically said variable quantity and the effective resultant of said subtraction.

28. Apparatus as in claim 27 wherein said second register is a remainder register and the digital signals which it supplies represent a variable remainder quantity having a variable sign, said fourth quantity being a constant scale factor having a fixed sign whereby the digital signals supplied by said third register are predetermined, and wherein said algebraic subtraction means includes means for operating on the said predetermined scale factor digital signals to cause the scale factor to be multiplied by $\pm 1$ according to the sign of the supplied remainder quantity signals.

29. In a digital computer, means, including a cyclically operable first register for storing each cycle a new set of digital signals resulting from a given computation during the same cycle and representing a new variable quantity, for supplying each such set of signals as an old variable quantity during the cycle next succeeding the cycle in which the set in question was stored in the first register, means including a second register operable in synchronization with said remainder register for supplying each cycle a respective second set of digital signals representing a respective second quantity, and means for operating each cycle on at least the said old variable and respective second quantity sets of signals so supplied during the cycle in question to invariably effect each cycle an algebraic subtraction of the same cycle's said old variable and second quantities and for supplying during the same cycle to said first register for storage thereby digital signals representing a said new variable quantity resulting from that same cycle's computation including said subtraction.

30. In a digital computer, means, including a cyclically operable remainder register for storing each cycle a new set of digital signals resulting from a given computation during the same cycle and representing a new remainder quantity, for supplying each such set of signals as an old remainder quantity during the cycle next succeeding the cycle in which the set in question was stored in the remainder register, means including a second register operable in synchronization with said remainder register for supplying each cycle a respective second set of digital signals representing a respective second quantity, and means, including computation means for operating each cycle on at least the said old remainder and respective second quantity sets of signals so supplied during the cycle in question to invariably effect each cycle an algebraic subtraction of the same cycle's said old remainder and second quantities to change the magnitude of that old remainder quantity at least toward zero, for supplying during the same cycle to said remainder register for storage thereby digital signals representing a said new remainder quantity resulting from that same cycle's computation including said subtraction.

31. Apparatus as in claim 30 wherein said second register stores a set of digital signals representing a constant scale factor having a fixed sign and said second set supply means supplies as foresaid said scale factor set of signals each cycle, said old remainder quantities being of different sign in different ones of said cycles, and wherein said computation means includes means for operating on each supplied scale factor signal set to cause it to represent before said subtraction a scale factor whose effective sign is the same as the effective sign of the old remainder quantity from which it is to be subtracted.

32. Apparatus as in claim 31 and further comprising first signal revolver means including a third register operable in synchronization with said remainder register for supplying each cycle a respective third set of digital signals representing a respective third quantity, second signal revolver means including a fourth register operable in synchronization with said remainder register for supplying each cycle a respective fourth set of digital signals representing a respective fourth quantity, said computation means further including means for operating each cycle on the supplied third quantity signal set of that cycle in accordance with the instant effective value of a signal representing an increment of variable sign to effect multiplication each cycle of that cycle's said third quantity by said variable sign increment to cause another and variable third quantity signal set during that cycle, means for operating each cycle on the supplied fourth quantity signal set of that cycle in accordance with the instant effective value of a signal representing an increment of variable sign to effect multiplication each cycle of that cycle's said fourth quantity by the last mentioned increment as it exists during that cycle to cause another and variable fourth quantity signal set during the cycle, there being means in said computation means for effectively summing algebraically the said another and fourth quantity signal sets of each cycle with the effective resultant signals of said subtraction for that cycle to cause the said new remainder quantity signals for that cycle to further include those resulting from said summing.

33. Apparatus as in claim 32 wherein the said first signal revolver means supplies the same set of digital signals each cycle whereby said third quantity has the same effective value each cycle, and wherein said second signal revolver means supplies the same set of digital signals in each cycle whereby said fourth quantity has the same effective value each cycle.

34. Apparatus as in claim 33 wherein the sets of digital signal respectively supplied by said first and second signal revolver means represent different numbers in each of at least some cycles.

35. Apparatus as in claim 31 and further comprising signal revolver means including a third register operable in synchronization with said remainder register for supplying each cycle a respective third set of digital signals representing a respective third quantity, there being an adder in said revolver means for changing the magnitude of said third quantity signal set by an amount and direction dependent upon the effective value of a variable increment signal, to effect a new third quantity signal set each cycle, said computation means further including means for operating each cycle on one of the two said third quantity signal sets which exist in that cycle in accordance with the instant effective value of a signal representing an increment of variable sign to effect multiplication each cycle of the said one of said third quantities of that cycle by that cycle's said variable sign increment to cause another variable third quantity signal set during that cycle, there being means in said computation means for effectively summing algebraically the said another variable third quantity signal set of each cycle with the effective resultant signals of said subtraction for that cycle to cause the said new remainder quantity signals for that cycle to further include those resulting from said summing.

36. Apparatus as in claim 35 and further including second signal revolver means including a fourth register operable in synchronization with said remainder register and a second adder for supplying each cycle a respective fourth set of digital signals representing a variable fourth quantity having a magnitude different from the magnitude which it had in the next prior cycle by an amount and direction dependent upon the effective value of a variable increment signal applied to said second adder during the instant cycle, said computation means further including means for operating each cycle on the said variable fourth quantity signal set effected during the instant cycle in accordance with the instant effective value of a signal representing an increment of variable sign to effect multiplication each cycle of that cycle's said fourth quantity by the last mentioned increment as it exists during that cycle to cause another variable fourth quantity signal set during that cycle, there being means in said computation means for effectively summing algebraically the said another variable fourth quantity signal set of each cycle with the effective resultant signals of said subtraction and first mentioned summing for that cycle to cause the said new remainder quantity signals for that cycle to further include those resulting from summing the said another variable fourth quantity signal set as aforesaid.

37. Apparatus as in claim 36 wherein the said one of the said two third quantity signal sets on which the aforesaid multiplication means operates each cycle is the unchanged third quantity signal set supplied during that cycle from the third register as opposed to the said new third quantity signal set of that cycle.

38. Apparatus as in claim 37 wherein each of at least some of the said new third quantity signal sets is different in its effective value than the effective value of the said fourth quantity signal set of the same cycle.

39. Apparatus as in claim 37 wherein the new third quantity signal set of any given cycle is the same as the said fourth quantity signal set of the same cycle.

40. Apparatus as in claim 39 wherein the effective value of the said variable sign increment in the said multiplication means operating on said variable fourth quantity signal set is equal in any given cycle to the effective value of the said variable sign increment in the said multiplication means operating on the said unchanged third quantity signal set in the same cycle.

41. Apparatus as in claim 40 wherein the effective value of each of the said variable sign increments in any given cycle depends on the sign of the new remainder quantity of the next prior cycle.

42. In a digital computer, incremental arithmetic apparatus operable in accordance with the general integral form $$W = 1/S \int U dQ + 1/S \int V dT$$

wherein S is a scale factor and whereby at least one of the quantities W, V, Q, T, and U may be incrementally solved for in terms of the others comprising means for supplying groups of digital signals representing V, U, and S repectively at the beginning of a given computation cycle, means for supplying digital signals representing at least increments $\Delta U$, $\Delta T$, $\Delta Q$, and $\Delta W$ to be employed in said cycle, an output line, and means for substantially simultaneously combining all of said signals in said cycle in a given manner and with a group of digital signals all previously present on said output line and representing a composite remainder signal R from a prior computation cycle to form on said output line during said given computation cycle a new group of digital signals representing a new composite remainder signal $R_1$ equal in mathematical expression to $$R + (U + \Delta U)\Delta Q + V\Delta T - S\Delta W$$

43. In a digital computer, incremental arithmetic apparatus operable in accordance with the general integral form $$W = 1/S \int U dV + 1/S \int V dU$$

wherein S is a scale factor and whereby at least one of the quantities W, V, and U may be incrementally solved for in terms of the others comprising means for supplying groups of digital signals representing V, U, and S respectively at the beginning of a given computation cycle, means for supplying digital signals representing at least increments $\Delta U$, $\Delta V$, and $\Delta W$ to be employed in said cycle, an output line, and means for substantially simultaneously combining all of said signals in said cycle in a given manner and with a group of digital signals all previously present on said output line and representing a composite remainder signal R from a prior computation cycle to form on said output line during said given computation cycle a new group of digital signals representing a new composite remainder signal $R_1$ equal in mathematical expression to $$R+(U+\Delta U)\Delta V+V\Delta U-S\Delta W$$

44. In a digital computer, incremental apparatus operable in accordance with the general integral form $$W=1/S\int UdV$$

wherein S is a scale factor and whereby at least one of the quantities W and U may be incrementally solved for in terms of the others comprising means for supplying groups of digital signals representing V, U and S respectively at the beginning of a given computation cycle, means for supplying digital signals representing at least increments $\Delta V$, $\Delta U$, and $\Delta W$ to be employed in said cycle, an output line, and means for substantially simultaneously combining all of said signals in said cycle in a given manner and with a group of digital signals all previously present on said output line and representing a composite remainder signal R from a prior computation cycle to form on said output line during said given computation cycle a new group of digital signals representing a new composite remainder signal $R_1$ equal in mathematical expression to $$R+(U+\Delta U)\Delta V-S\Delta W$$

including means for making the signal for the quantity $S\Delta U$ itself have a sign value the same as said remainder signal R.

45. In a digital incremental computer, means for storing and cyclically delivering groups of digital signals respectively representing in a general sense three numerical quantities V, U, and R and a constant scale factor S, means for determining the values of and supplying for each cycle digital signals representing variable increments $\Delta V$, $\Delta U$, $\Delta T$, $\Delta Q$, and $\Delta W$, means for substantially simultaneously combining in a given manner during each cycle all of the said signals for the respective cycle including: means for effectively adding the instant cycle V and $\Delta V$ signals to obtain resultant V signals $V_1$ for the next cycle, means for effectively adding the instant cycle U and $\Delta U$ signals to obtain resultant U signals $U_1$ for the next cycle, means for effectively multiplying the $U_1$ and instant cycle $\Delta Q$ signals to obtain $U_1\Delta Q$ signals, means for effectively multiplying the instant cycle V and $\Delta T$ signals to obtain $V\Delta T$ signals, means for effectively negatively multiplying the instant cycle S and $\Delta W$ signals to obtain $-S\Delta W$ signals, and means for effectively adding the instant cycle's said R, $U_1\Delta Q$, $V\Delta T$, and $-S\Delta W$ signals to obtain resultant R signals $R_1$ for the next cycle; and means for inserting the said resultant $V_1$, $U_1$, and $R_1$ signals into said storing and delivering means in a non-precessing manner for delivery thereby of the said $V_1$, $U_1$, and $R_1$ signals in the next cycle respectively as that next cycle's instant V, U, and R signals.

46. Apparatus as in claim 43 wherein the said increment signal determining and supplying means includes means for sensing the sign of the resultant R signals of each cycle and for causing at least a predetermined one of the said $\Delta V$, $\Delta U$, $\Delta T$, $\Delta Q$, and $\Delta W$ increments in each cycle to effectively represent a binary $\pm 1$ in accordance with the sign of the resultant R signal in the next prior cycle.

47. In a digital incremental computer, means for storing and cyclically delivering groups of digital signals respectively representing in a general sense three numerical quantities V, U, and R and a constant scale factor S, means for determining the values of and supplying for each cycle digital signals representing variable increments $\Delta V$, $\Delta U$, and $\Delta W$, means for substantially simultaneously combining in a given manner during each cycle all of the said signals for the respective cycle including: means for effectively adding the instant cycle V and $\Delta V$ signals to obtain resultant V signals $V_1$ for the next cycle, means for effectively adding the instant cycle U and $\Delta U$ signals to obtain resultant U signals $U_1$, for the next cycle, means for effectively multiplying the $U_1$ and instant cycle $\Delta V$ signals to obtain $U_1\Delta V$ signals, means for effectively multiplying the instant cycle V and $\Delta U$ signals to obtain $V\Delta U$ signals, means for effectively negatively multiplying the instant cycle S and $\Delta W$ signals to obtain $-S\Delta W$ signals, and means for effectively adding the instant cycle's said R, $U_1\Delta V$, $V\Delta U$, and $-S\Delta W$ signals to obtain resultant R signals $R_1$ for the next cycle; and means for inserting the said resultant $V_1$, $U_1$, and $R_1$ signals into said storing and delivering means in a non-precessing manner for delivery thereby of the said $V_1$, $U_1$, and $R_1$ signals in the next cycle respectively as that next cycle's instant V, U, and R signals.

48. In a digital incremental computer, means for storing and cyclically delivering groups of digital signals respectively representing three constant numbers $V_o$, $U_o$ and a scale factor S along with a variable quantity generally designated R, means for determining and supplying for each cycle digital signals representing at least variable increments $\Delta T$, $\Delta Q$ and $\Delta W$, means for substantially simultaneously combining in a given manner during each cycle all of the said signals for the respective cycle including: means for effectiveely multiplying the $U_o$ and instant cycle $\Delta Q$ signals to obtain $U_o\Delta Q$ signals, means for effectively multiplying the $V_o$ and instant cycle $\Delta T$ signals to obtain $V_o\Delta T$ signals, means for effectively negatively multiplying the instant cycle S and $\Delta W$ signals to obtain $-S\Delta W$ signals, and means for effectively adding the instant cycle's said R, $U_o\Delta A$, $V_o\Delta T$, and $-S\Delta W$ signals to obtain resultant R signals $R_1$ for the next cycle; and means for inserting at least the said resultant $R_1$ signals into said storing and delivering means in a non-precessing manner for delivery thereby of said $R_1$ signals in the next cycle as that next cycle's instant R signals.

49. In a digital incremental computer, means for storing and cyclically delivering groups of digital signals respectively representing in a general sense the numerical quantities U and R and a constant scale factor S, means for determining the values of and supplying for each cycle digital signals representing variable increments $\Delta V$, $\Delta U$, and $\Delta W$, means for substantially simultaneously combining in a given manner during each cycle all of the said signals for the respective cycle including: means for effectively adding the instant cycle U and $\Delta U$ signals to obtain resultant U signals $U_1$ for the next cycle, means for effectively multiplying the $U_1$ and instant cycle $\Delta V$ signals to obtain $U_1\Delta V$ signals, means for effectively negatively multiplying the instant cycle S and $\Delta W$ signals to obtain $-S\Delta W$ signals, and means for effectively adding the instant cycle's said R, $U_1\Delta V$, and $-S\Delta W$ signals to obtain resultant R signals $R_1$ for the next cycle; and means for inserting the said resulting $U_1$ and $R_1$ signals into said storing and delivering means in a non-precessing manner for delivery thereby of the said $U_1$ and $R_1$ signals in the next cycle respectively as that next cycle's instant U and R signals.

50. In computing apparatus wherein a set of values of a mathematical function involving a plurality of main variables is computed from a set of predetermined values constituting a solution to said function at a given time with any subsequent solution to said function being obtained by a step by step incremental process whereby a subsequent solution is measured by a change in a previously computed solution or solutions modified by a small change in the function variables, a subsequent solution being designated as correct when a remainder resulting therefrom approaches zero as a limit, the improvement of: means for obtaining signals representing said remainder including means for effectively adding: (A) digital signals representing the remainder of the last previous solution, (B) digital signals representing the product of the current value of one of said variables and a first increment, (C) digital signals representing the product of a prior value of another of said variables and the current value of a second increment, and (D) digital signals representing the product of a scale factor and the current value of a third increment, to form digital signals representing a sum, and for effectively subtracting from said sum signals digital signals representing the product of a scale factor and the current value of a fourth increment; and means for selectively forming each of said product signals including means for selectively obtaining signals representing each of said increments, whereby numerous numerical relationships can exist between said variables to provide a multiplicity of said mathematical functions.

51. In a digital increment computer, means for storing and supplying digital signals representing the values of at least two numbers constituting a solution at a given time to a mathematical function to be computed, means substantially simultaneously operative on said signals at at least one time later than said given time for obtaining at least one remainder signal with any subsequent solution to the function being by an incremental process, such subsequent solution being designated as correct when the remainder signal approaches zero as a limit, the means for obtaining said remainder signal including means for conditionally incrementally modifying supplied digital signals representing a first of said numbers by a first increment signal, means for conditionally complementing the said supplied first number signals dependent upon the effective value of a second increment signal, means for conditionally incrementally modifying supplied signals representing a second of said numbers by a signal representing the effective value of a third increment, means for conditionally complementing the conditionally modified second number signals dependent upon the effective value of a fourth increment signal, means for conditionally complementing signals representing a scale factor in accordance with the effective value of a fifth increment signal, means for effectively negatively complementing conditionally the said uncomplemented scale factor signals in accordance with the effective value of a sixth increment signal, and summation means for effectively summing all the resultant conditionally complemented signals with the remainder signal of the last previous solution to obtain a new remainder signal.

References Cited in the file of this patent
UNITED STATES PATENTS

| | | |
|---|---|---|
| 2,701,095 | Stibitz | Feb. 1, 1955 |
| 2,717,994 | Dickinson et al. | Sept. 13, 1955 |
| 2,787,416 | Hansen | Apr. 2, 1957 |
| 2,815,168 | Zukin | Dec. 3, 1957 |
| 2,834,543 | Burkhart | May 13, 1958 |
| 2,850,232 | Hagen et al. | Sept. 2, 1958 |
| 2,852,187 | Beck | Sept. 16, 1958 |

FOREIGN PATENTS

| | | |
|---|---|---|
| 162,263 | Australia | Mar. 30, 1955 |
| 1,055,460 | France | Oct. 14, 1953 |
| 1,094,570 | France | Dec. 8, 1954 |
| 745,816 | Great Britain | Mar. 7, 1956 |

OTHER REFERENCES

Journal of the Franklin Institute, "A New Type of Differential Analyzer," by Bush et al., October 1945 (pages 255 to 326).

Math. Tables and Other Aids to Computation, "The Serial-Memory Digital Differential Analyzer," April 1952 (pages 102 to 112).